US011605965B2

(12) United States Patent
Lee et al.

(10) Patent No.: US 11,605,965 B2
(45) Date of Patent: Mar. 14, 2023

(54) ELECTRONIC DEVICE FOR ADAPTIVE POWER MANAGEMENT

(71) Applicant: Samsung Electronics Co., Ltd., Suwon-si (KR)

(72) Inventors: Hyeonsu Lee, Suwon-si (KR); Chunggeol Kim, Suwon-si (KR); Hojung Choi, Suwon-si (KR); Jeongmin Moon, Suwon-si (KR); Gyusung Cho, Suwon-si (KR); Mooyoung Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 384 days.

(21) Appl. No.: 16/793,665

(22) Filed: Feb. 18, 2020

(65) Prior Publication Data

US 2020/0266649 A1 Aug. 20, 2020

(30) Foreign Application Priority Data

Feb. 18, 2019 (KR) .................. 10-2019-0018654

(51) Int. Cl.
*H02J 7/00* (2006.01)
*G06F 1/3231* (2019.01)
*G06F 3/04847* (2022.01)

(52) U.S. Cl.
CPC ...... *H02J 7/007188* (2020.01); *G06F 1/3231* (2013.01); *G06F 3/04847* (2013.01); *H02J 7/00034* (2020.01)

(58) Field of Classification Search
CPC .... H02J 7/345; H02J 50/10; H02J 7/35; H02J 1/10; H02J 13/00004; H02J 2300/24;
(Continued)

(56) References Cited

U.S. PATENT DOCUMENTS 6,275,715 B1 8/2001 Motohashi
9,210,662 B1 12/2015 Brown et al.
(Continued)

FOREIGN PATENT DOCUMENTS

KR 10-2017-0057314 A 5/2017
KR 10-2017-0060516 A 6/2017
WO 2015/183459 A1 12/2015

OTHER PUBLICATIONS

International Search Report dated Jun. 5, 2020 in connection with International Patent Application No. PCT/KR2020/002255, 3 pages.
(Continued)

*Primary Examiner* — Binh C Tat

(57) ABSTRACT

An electronic device includes: a location measurement circuitry; a rechargeable battery; a memory configured to store instructions; and at least one processor. The at least one processor may be configured to execute the instructions to: monitor a usage pattern of the battery while the electronic device operates in a first power management state; acquire, based on determining that the usage pattern of the battery is different from a reference pattern derived from a model, information on a location in which the battery is estimated to be charged and information on a time at which the battery is estimated to be charged using the model; and switch, partially based on the information on the location and the information on the time, the first power management state to a second power management state based on a second maximum driving frequency lower than the first maximum driving frequency.

19 Claims, 20 Drawing Sheets

(58) Field of Classification Search
CPC .. H02J 2310/14; H02J 2310/48; H02J 3/0075; H02J 3/14; H02J 3/32; H02J 3/38; H02J 3/381; H02J 7/00032; H02J 7/00034; H02J 7/0013; H02J 7/0044; H02J 7/0047; H02J 7/0048; H02J 7/0071; H02J 7/00714; H02J 7/007188; H02J 7/007192; H02J 9/06; Y04S 10/126; Y04S 20/12; H04L 1/1874; H04L 1/0041; H04L 1/0002
USPC .................................................. 320/137–146
See application file for complete search history.

(56) References Cited

U.S. PATENT DOCUMENTS

| | | | |
|---|---|---|---|
| 9,338,749 | B2 | 5/2016 | Kim |
| 10,222,428 | B2 | 3/2019 | Saint-Marcoux et al. |
| 10,427,535 | B2 | 10/2019 | Park et al. |
| 2013/0226486 | A1* | 8/2013 | Henderson ......... A63B 24/0062 324/426 |
| 2014/0215241 | A1 | 7/2014 | Yoon et al. |
| 2015/0164391 | A1* | 6/2015 | Hernandez-Rosas ........................ A61B 5/0022 600/365 |
| 2016/0041231 | A1 | 2/2016 | Lee |
| 2016/0141893 | A1 | 5/2016 | Lee et al. |
| 2016/0262108 | A1 | 9/2016 | Weast et al. |
| 2017/0371394 | A1* | 12/2017 | Chan ..................... G06F 1/3218 |
| 2018/0373316 | A1 | 12/2018 | Maisuria et al. |

OTHER PUBLICATIONS

Written Opinion of the International Searching Authority dated Jun. 5, 2020 in connection with International Patent Application No. PCT/KR2020/002255, 5 pages.

European Search Report dated Jun. 9, 2020 in connection with European Patent Application No. 20 15 7957, 9 pages.

* cited by examiner

ELECTRONIC DEVICE FOR ADAPTIVE POWER MANAGEMENT

CROSS-REFERENCE TO RELATED APPLICATION

This application is based on and claims priority under 35 U.S.C. 119 to Korean Patent Application No. 10-2019-0018654 filed on Feb. 18, 2019 in the Korean Intellectual Property Office, the disclosure of which is herein incorporated by reference in its entirety.

BACKGROUND

1. Field

Various embodiments of the present disclosure relate to an electronic device for adaptive power management.

2. Description of Related Art

Various embodiments described below relate to power management for an electronic device including a rechargeable battery. Various embodiments relate to an electronic device and a method for adaptive power management, and a computer-readable medium.

Power management for a data processing system of a portable device such as a laptop computer or a handheld computer may often involve technology for reducing power consumed by elements in the data processing system.

The above information is presented as background information only to assist with an understanding of the disclosure. No determination has been made, and no assertion is made, as to whether any of the above might be applicable as prior art with regard to the disclosure.

SUMMARY

Users of a portable device including a rechargeable battery may prefer the battery not to run out during the use of the portable device. Contrary to the users' preference, the conventional portable devices can perform power management actions for adjusting a charged rate of a battery only when the remaining level of the battery is very low.

The technical aspects achieved in the document are limited to the above-described technical aspect, and other technical aspects which are not mentioned may be clearly understood, through the following descriptions, by those skilled in the art to which the disclosure belongs.

In accordance with various embodiments, an electronic device may include: a location measurement circuitry; a rechargeable battery; a memory configured to store instructions; and at least one processor, wherein the at least one processor may be configured to execute the instructions so as to: monitor a usage pattern of the battery while the electronic device operates in a first power management state including a state in which the at least one processor is driven based on a first maximum driving frequency; acquire, based on determining that the usage pattern of the battery is different from a reference pattern derived from a model trained based on a discharging history of the battery and a charging history of the battery, information on a location in which the battery is estimated to be charged and information on a time at which the battery is estimated to be charged, using the model; and switch, at least partially based on the information on the location and the information on the time, the first power management state to a second power management state including a state in which the at least one processor is driven based on a second maximum driving frequency lower than the first maximum driving frequency.

In accordance with various embodiments, a method for executing instructions in an electronic device including a location measurement circuitry, a rechargeable battery, and at least one processor may include: monitoring a usage pattern of the battery while the electronic device operates in a first power management state including a state in which the at least one processor is driven based on a first maximum driving frequency; acquiring, based on determining that the usage pattern of the battery is different from a reference pattern derived from a model trained based on a discharging history of the battery and a charging history of the battery, information on a location in which the battery is estimated to be charged and information on a time at which the battery is estimated to be charged, using the model; and switching, at least partially based on the information on the location and the information on the time, the first power management state to a second power management state including a state in which the at least one processor is driven based on a second maximum driving frequency lower than the first maximum driving frequency.

A non-transitory computer readable storage medium according to various embodiments may store one or more programs including instructions that instruct, when executed by at least one processor of an electronic device including a location measurement circuitry, a rechargeable battery, and the at least one processor, the electronic device to: monitor a usage pattern of the battery while the electronic device operates in a first power management state including a state in which the at least one processor is driven based on a first maximum driving frequency; acquire, based on determining that the usage pattern of the battery is different from a reference pattern derived from a model trained based on a discharging history of the battery and a charging history of the battery, information on a location in which the battery is estimated to be charged and information on a time at which the battery is estimated to be charged, using the model; and switch, at least partially based on the information on the location and the information on the time, the first power management state to a second power management state including a state in which the at least one processor is driven based on a second maximum driving frequency lower than the first maximum driving frequency.

An electronic device according to various embodiments may include: a location measurement circuitry; a rechargeable battery; a memory configured to store instructions; and at least one processor, wherein the at least one processor may be configured to execute the instructions so as to: while it is identified using the location measurement circuitry that the electronic device operating in a first power management state is within a first location, identify a discharge rate of the battery; and switch the first power management state to a second power management state, based on data obtained by applying information on the discharge rate and information on the first location to a model trained based on a discharging history of the battery and a charging history of the battery, and so as to: while it is identified using the location measurement circuitry that the electronic device operating in the first power management state is within a second location different from the first location, identify the discharge rate of the battery; and maintain the first power management state, based on another data obtained by applying the information on the discharge rate and information on the second location to the model.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
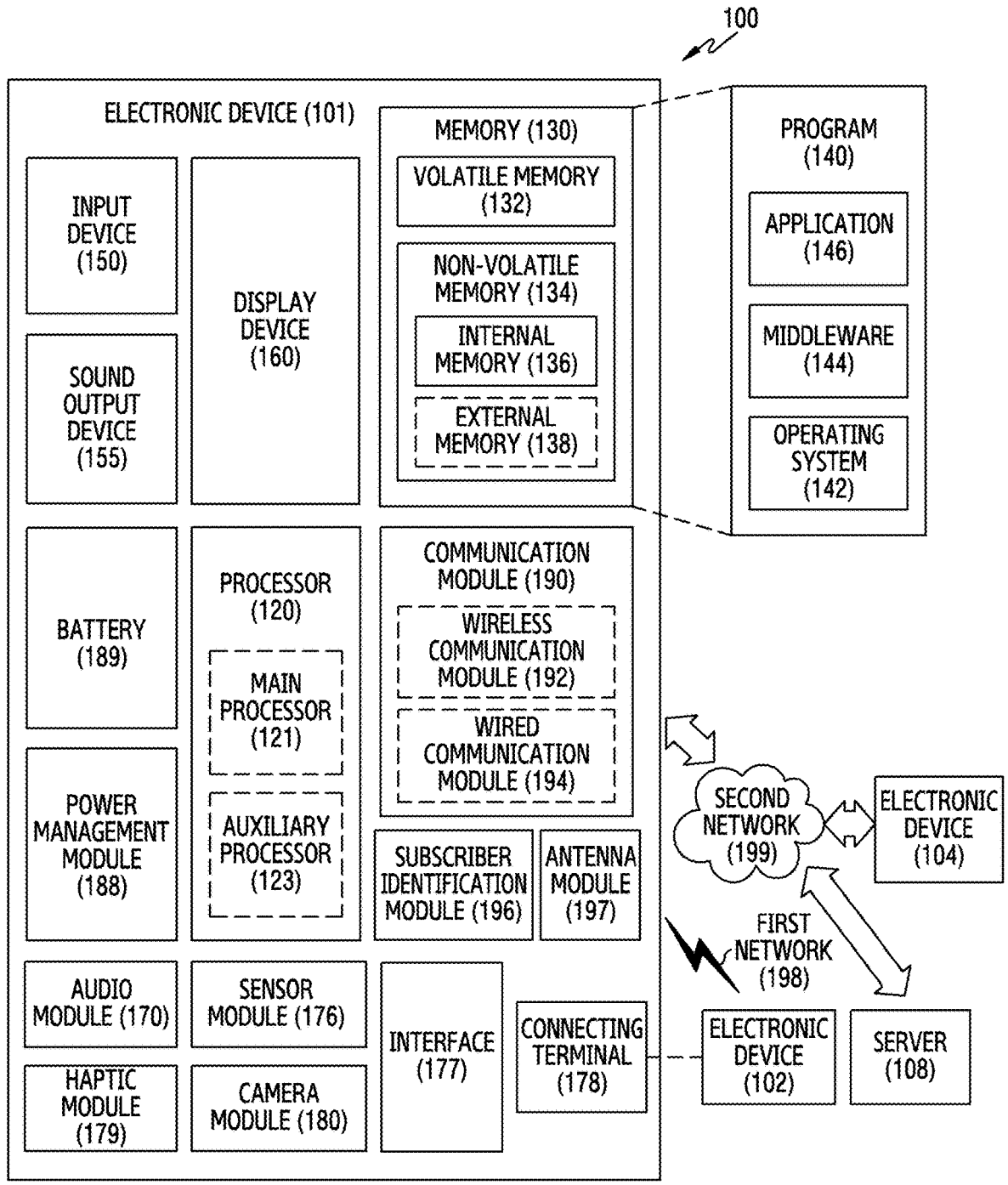
FIG. 1 illustrates a block diagram of an electronic device in a network environment according to various embodiments.

FIG. 1 is a block diagram illustrating an electronic device (101) in a network environment (100) according to various embodiments. Referring to FIG. 1, the electronic device (101) in the network environment (100) may communicate with an electronic device (102) via a first network (198) (e.g., a short-range wireless communication network), or an electronic device (104) or a server (108) via a second network (199) (e.g., a long-range wireless communication network). According to an embodiment, the electronic device (101) may communicate with the electronic device (104) via the server (108). According to an embodiment, the electronic device (101) may include a processor (120), memory (130), an input device (150), a sound output device (155), a display device (160), an audio module (170), a sensor module (176), an interface (177), a haptic module (179), a camera module (180), a power management module (188), a battery (189), a communication module (190), a subscriber identification module(SIM) (196), or an antenna module (197). In some embodiments, at least one (e.g., the display device (160) or the camera module (180)) of the components may be omitted from the electronic device (101), or one or more other components may be added in the electronic device (101). In some embodiments, some of the components may be implemented as single integrated circuitry. For example, the sensor module (176) (e.g., a fingerprint sensor, an iris sensor, or an illuminance sensor) may be implemented as embedded in the display device (160) (e.g., a display).

The processor (120) may execute, for example, software (e.g., a program (140)) to control at least one other component (e.g., a hardware or software component) of the electronic device (101) coupled with the processor (120), and may perform various data processing or computation. According to one embodiment, as at least part of the data processing or computation, the processor (120) may load a command or data received from another component (e.g., the sensor module (176) or the communication module (190)) in volatile memory (132), process the command or the data stored in the volatile memory (132), and store resulting data in non-volatile memory (134). According to an embodiment, the processor (120) may include a main processor (121) (e.g., a central processing unit (CPU) or an application processor (AP)), and an auxiliary processor (123) (e.g., a graphics processing unit (GPU), an image signal processor (ISP), a sensor hub processor, or a communication processor (CP)) that is operable independently from, or in conjunction with, the main processor (121). Additionally or alternatively, the auxiliary processor (123) may be adapted to consume less power than the main processor (121), or to be specific to a specified function. The auxiliary processor (123) may be implemented as separate from, or as part of the main processor (121).

The auxiliary processor (123) may control at least some of functions or states related to at least one component (e.g., the display device (160), the sensor module (176), or the communication module (190)) among the components of the electronic device (101), instead of the main processor (121) while the main processor (121) is in an inactive (e.g., sleep) state, or together with the main processor (121) while the main processor (121) is in an active state (e.g., executing an application). According to an embodiment, the auxiliary processor (123) (e.g., an image signal processor or a communication processor) may be implemented as part of another component (e.g., the camera module (180) or the communication module (190)) functionally related to the auxiliary processor (123).

The memory (130) may store various data used by at least one component (e.g., the processor (120) or the sensor module (176)) of the electronic device (101). The various data may include, for example, software (e.g., the program (140)) and input data or output data for a command related thereto. The memory (130) may include the volatile memory (132) or the non-volatile memory (134).

The program (140) may be stored in the memory (130) as software, and may include, for example, an operating system (OS) (142), middleware (144), or an application (146).

The input device (150) may receive a command or data to be used by other components (e.g., the processor (120)) of the electronic device (101), from the outside (e.g., a user) of the electronic device (101). The input device (150) may include, for example, a microphone, a mouse, a keyboard, or a digital pen (e.g., a stylus pen).

The sound output device (155) may output sound signals to the outside of the electronic device (101). The sound output device (155) may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device (160) may visually provide information to the outside (e.g., a user) of the electronic device (101). The display device (160) may include, for example, a display, a hologram device, or a projector and control circuitry to control a corresponding one of the display, hologram device, and projector. According to an embodiment, the display device (160) may include touch circuitry adapted to detect a touch, or sensor circuitry (e.g., a pressure sensor) adapted to measure the intensity of force incurred by the touch.

The audio module (170) may convert a sound into an electrical signal and vice versa. According to an embodiment, the audio module (170) may obtain the sound via the input device (150), or output the sound via the sound output device (155) or a headphone of an external electronic device (e.g., an electronic device (102)) directly (e.g., wiredly) or wirelessly coupled with the electronic device (101).

The sensor module (176) may detect an operational state (e.g., power or temperature) of the electronic device (101) or an environmental state (e.g., a state of a user) external to the electronic device (101), and then generate an electrical signal or data value corresponding to the detected state. According to an embodiment, the sensor module (176) may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface (177) may support one or more specified protocols to be used for the electronic device (101) to be coupled with the external electronic device (e.g., the electronic device (102)) directly (e.g., wiredly) or wirelessly. According to an embodiment, the interface (177) may include, for example, a high definition multimedia interface (HDMI), a universal serial bus (USB) interface, a secure digital (SD) card interface, or an audio interface.

A connecting terminal (178) may include a connector via which the electronic device (101) may be physically connected with the external electronic device (e.g., the electronic device (102)). According to an embodiment, the connecting terminal (178) may include, for example, a HDMI connector, a USB connector, a SD card connector, or an audio connector (e.g., a headphone connector).

The haptic module (179) may convert an electrical signal into a mechanical stimulus (e.g., a vibration or a movement) or electrical stimulus which may be recognized by a user via his tactile sensation or kinesthetic sensation. According to an embodiment, the haptic module (179) may include, for example, a motor, a piezoelectric element, or an electric stimulator.

The camera module (180) may capture a still image or moving images. According to an embodiment, the camera module (180) may include one or more lenses, image sensors, image signal processors, or flashes.

The power management module (188) may manage power supplied to the electronic device (101). According to one embodiment, the power management module (188) may be implemented as at least part of, for example, a power management integrated circuit (PMIC).

The battery (189) may supply power to at least one component of the electronic device (101). According to an embodiment, the battery (189) may include, for example, a primary cell which is not rechargeable, a secondary cell which is rechargeable, or a fuel cell.

The communication module (190) may support establishing a direct (e.g., wired) communication channel or a wireless communication channel between the electronic device (101) and the external electronic device (e.g., the electronic device (102), the electronic device (104), or the server (108)) and performing communication via the established communication channel. The communication module (190) may include one or more communication processors that are operable independently from the processor (120) (e.g., the application processor (AP)) and supports a direct (e.g., wired) communication or a wireless communication. According to an embodiment, the communication module (190) may include a wireless communication module (192) (e.g., a cellular communication module, a short-range wireless communication module, or a global navigation satellite system (GNSS) communication module) or a wired communication module (194) (e.g., a local area network (LAN) communication module or a power line communication (PLC) module). A corresponding one of these communication modules may communicate with the external electronic device via the first network (198) (e.g., a short-range communication network, such as Bluetooth™, wireless-fidelity (Wi-Fi) direct, or infrared data association (IrDA)) or the second network (199) (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module (192) may identify and authenticate the electronic device (101) in a communication network, such as the first network (198) or the second network (199), using subscriber information (e.g., international mobile subscriber identity (IMSI)) stored in the subscriber identification module (196).

The antenna module (197) may transmit or receive a signal or power to or from the outside (e.g., the external electronic device) of the electronic device (101). According to an embodiment, the antenna module (197) may include a plurality of antennas. In such a case, at least one antenna appropriate for a communication scheme used in the communication network, such as the first network (198) or the second network (199), may be selected, for example, by the communication module (190) (e.g., the wireless communication module (192)) from the plurality of antennas. The signal or the power may then be transmitted or received between the communication module (190) and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device (101) and the external electronic device (104) via the server (108) coupled with the second network (199). Each of the electronic devices (102) and (104) may be a device of a same type as, or a different type, from the electronic device (101). According to an embodiment, all or some of operations to be executed at the electronic device (101) may be executed at one or more of the external electronic devices (102), (104), or (108). For example, if the electronic device (101) should perform a function or a service automatically, or in response to a request from a user or another device, the electronic device (101), instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device (101). The electronic device (101) may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program (140)) including one or more instructions that are stored in a storage medium (e.g., internal memory (136) or external memory (138)) that is readable by a machine (e.g., the electronic device (101)). For example, a processor (e.g., the processor (120)) of the machine (e.g., the electronic device (101)) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

An electronic device may include a rechargeable battery for portability. Users of the electronic device may prefer the battery not to run out during the use of the electronic device. When the electronic device operates using power supplied from the battery, performing power management actions based on the fact that the remaining level of the battery does not reach a reference level or based on the users' explicit inputs may not fit the user preference described above.

An electronic device (e.g. an electronic device 101) according to various embodiments may include: a location measurement circuitry (e.g. a sensor module 176 and/or a communication module 190); a rechargeable battery; a memory (e.g. a memory 130) for storing instructions; and at least one processor (e.g. a processor 120), wherein the at least one processor may be configured to execute the instructions so as to: monitor a usage pattern of the battery while the electronic device operates in a first power management state including a state in which the at least one processor is driven based on a first maximum driving frequency; acquire, based on determining that the usage pattern of the battery is different from a reference pattern derived from a model trained based on a discharging history of the battery and a charging history of the battery, information on a location in which the battery is estimated to be charged and information on a time at which the battery is estimated to be charged, using the model; and switch, at least partially based on the information on the location and the information on the time, the first power management state to a second power management state including a state in which the at least one processor is driven based on a second maximum driving frequency lower than the first maximum driving frequency.

In various embodiments, the model may be a model configured to provide a result having reliability equal to or higher than reference reliability to input target data. In various embodiments, the model may be configured to predict a future charging pattern of the battery and a future discharging pattern of the battery based on past battery operating heuristics including the discharging history of the battery and the charging history of the battery.

In various embodiments, the at least one processor may be configured to execute the instructions so as to: detect charging of the battery; identify a location of the charging of the battery by using the location measurement circuitry in response to the detection; identify a period of time during which the battery has been charged, in response to detecting a release of the charging of the battery; and compile the charging history of the battery based on the identified location and the identified period of time.

In various embodiments, the at least one processor may be configured to execute the instructions so as to: identify, during discharging of the battery, the remaining level of the battery, the discharge rate of the battery, the type of application causing the battery to be discharged, and a period of time during which the battery is discharged; and compile the discharging history of the battery based on the remaining level of the battery, the discharge rate of the battery, the type of application causing the battery to be discharged, and the period of time during which the battery is discharged.

In various embodiments, the at least one processor may be configured to execute the instructions so as to monitor the usage pattern of the battery in each designated period while the at least one processor is in a wake-up state.

In various embodiments, the at least one processor may be configured to execute the instructions so as to defer monitoring the usage pattern of the battery in each designated period while the at least one processor is in a sleep state.

In various embodiments, the first power management state may further include a state in which the memory is driven based on a third maximum driving frequency, and the second power management state may further include a state in which the memory is driven based on a fourth maximum driving frequency lower than the third maximum driving frequency.

In various embodiments, the electronic device may further include a display (e.g. a display device 160), the first power management state may further include a state in which a screen is displayed at first brightness on the display, and the second power management state may further include a state in which a screen is displayed on the display at second brightness lower than the first brightness.

In various embodiments, the first power management state may further include a state in which a screen is displayed on the display based on a first frame rate, and the second power management state may further include a state in which a screen is displayed on the display based on a second frame rate lower than the first frame rate.

In various embodiments, the first power management state may further include a state in which a screen is displayed on the display at a first resolution, and the second power management state may further include a state in which a screen is displayed on the display at a second resolution lower than the first resolution.

In various embodiments, first power management state may include a state in which a high-performance cluster among multiple clusters of the at least one processor is used, and the second power management state may include a state in which the use of the high-performance cluster among the multiple clusters is restricted. For example, the at least one processor may be configured to execute the instructions so as to restrict the use of the high-performance cluster by migrating a task executed using the high-performance cluster to a power-saving cluster in response to the switch to the second power management state.

In various embodiments, the at least one processor may be configured to execute the instructions so as to: acquire information on a location of the electronic device by using the location measurement circuitry; compare the information on the location of the electronic device with the information, acquired from the model, on the location in which the battery is estimated to be charged; compare a present time with the time at which the battery is estimated be charged; and switch, based on the result of the comparisons, the first power management state to the second power management state. For example, the location measurement circuitry may include at least one of a global positioning system (GPS) or at least one communication circuit.

In various embodiments, the at least one processor may be configured to execute the instructions so as to display, on the display, a user interface including an object for selecting whether to enable an adaptive power management state in which one among multiple power management states including the first power management state and the second power management state is adaptively selected using the model. The object may be provided in a non-executable state while the reliability of result data derived from the model is lower than reference reliability, and may be provided in an executable state while the reliability of the result data derived from the model is equal to or higher than the reference reliability. For example, the object provided in the executable state may have a first state indicating that the adaptive power management state is enabled and a second state indicating that the adaptive power management state is disabled. In various embodiments, the user interface may further include a list including multiple objects for indicating the multiple power management states, respectively. The at least one processor may be configured to execute the instructions so as to: enable the adaptive power management state based on identifying that the object is in the first state; while the adaptive power management state is enabled, monitor the usage pattern of the battery while the electronic device operates in the first power management state; while the adaptive power management state is enabled, acquire, based on determining that the usage pattern of the battery is different from the reference pattern, the information on the location in which the battery is estimated to be charged and the information on the time at which the battery is estimated to be charged, using the model; and while the adaptive power management state is enabled, switch, at least partially based on the information on the location and the information on the time, the first power management state to the second power management state in which the at least one processor is driven based on the second maximum driving frequency lower than the first maximum driving frequency.

In various embodiments, the at least one processor may be configured to execute the instructions so as to: indicate in the list that when the electronic device is in the first power management state while the adaptive power management state is enabled, the first power management state is selected from among the multiple power management states; and indicate in the list that when the electronic device is in the second power management state while the adaptive power management state is enabled, the second power management state is selected from among the multiple power management states.

In various embodiments, the at least one processor may be configured to execute the instructions so as to: identify an estimated load level of the at least one processor by using the model; determine whether the estimated load level is lower than a reference load level; configure a maximum driving frequency of the at least one processor as a third driving frequency based on a determination that the estimated load level is lower than the reference load level; and configure the maximum driving frequency of the at least one processor as a fourth driving frequency higher than the third driving frequency based on a determination that the estimated load level is equal to or higher than the reference load level.

In various embodiments, the electronic device may include: a location measurement circuitry; a rechargeable battery; a memory configured to store instructions; and at least one processor, wherein the at least one processor may be configured to execute the instructions so as to: while it is identified using the location measurement circuitry that the electronic device operating in a first power management state is within a first location, identify a discharge rate of the battery; and switch the first power management state to a second power management state, based on data obtained by applying information on the discharge rate and information on the first location to a model trained based on a discharging history of the battery and a charging history of the battery, and so as to: while it is identified using the location measurement circuitry that the electronic device operating in the first power management state is within a second location different from the first location, identify the discharge rate of the battery; and maintain the first power management state, based on another data obtained by applying the information on the discharge rate and information on the second location to the model.

In various embodiments, the at least one processor may be configured to execute the instructions so as to: while it is identified using the location measurement circuitry that the electronic device is within the first location, identify the discharge rate; determine, by applying the discharge rate to the model, an estimated time point at which the remaining level of the battery reaches a reference battery level; and switch the first power management state to the second power management state, based on the estimated time point and the distance between the first location and a location which is acquired using the model and in which the battery is estimated to be charged, and so as to: while it is identified using the location measurement circuitry that the electronic device is within the second location, identify the discharge rate; determine the estimated time point by applying the discharge rate to the model; and maintain the first power management state, based on the estimated time point and the distance between the second location and the location.

In various embodiments, the at least one processor may be configured to execute the instructions so as to: switch the first power management state to the second power management state, based on the distance between the first location and the location in which the battery is estimated to be charged, a time of day at which the discharge rate has been identified, and a time of day at which the battery is estimated to be charged and which is acquired using the model; and maintain the first power management state, based on the distance between the second location and the location in which the battery is estimated to be charged, the time of day at which the discharge rate has been identified, and the time of day at which the battery is estimated to be charged and which is acquired using the model.

Figure 2:
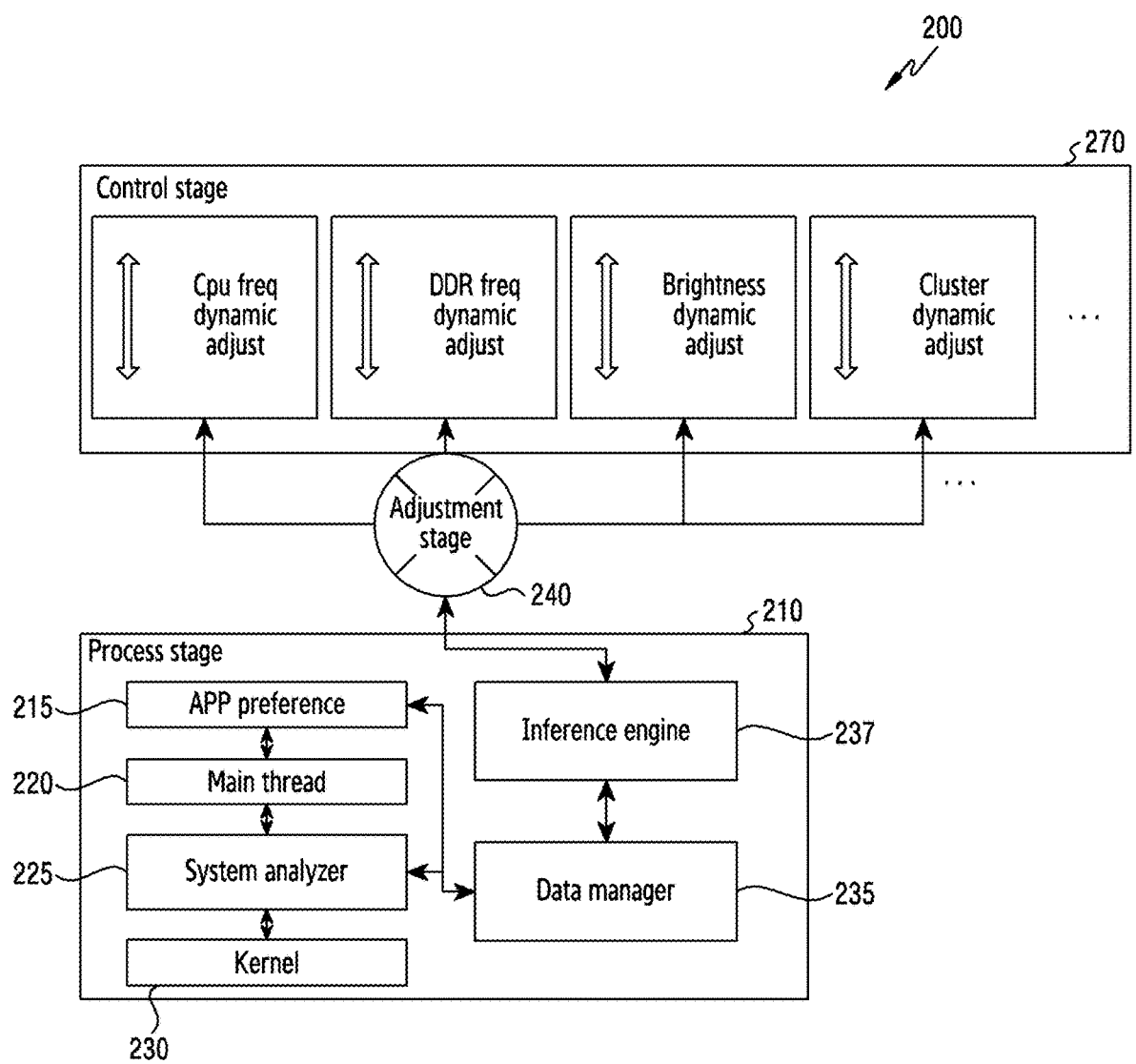
FIG. 2 is a block diagram illustrating an adaptive power management system according to various embodiments.

FIG. 2 is a block diagram illustrating an adaptive power management system 200 according to various embodiments. The adaptive power management system may be implemented by one of hardware or software in the processor 120 of the electronic device 101 illustrated in FIG. 1.

In accordance with various embodiments, the configuration of FIG. 2 will be described with reference to the elements of the electronic device 101 in FIG. 1.

Referring to FIG. 2, the adaptive power management system 200 may include a process stage 210, an adjustment stage 240, and a control stage 270.

In various embodiments, the process stage 210 may include an application preference 215, a main thread 220, a system analyzer 225, a kernel 230, a data manager 235, and an inference engine 237.

In various embodiments, the application preference 215 may acquire information related to an application executed in the electronic device 101. For example, the application preference 215 may acquire at least one among information on the type of an application executed in the electronic device 101, information on execution time of the application, information on the elements of the electronic device 101 used to execute the application, information on how often the application is used, or information on a user's preference for the application. The application preference 215 may provide the acquired information to the data manager 235.

In various embodiments, the main thread 220 may manage the adaptive power management system 200. In various embodiments, the main thread 220 may control the application preference 215 and system analyzer 225. In various embodiments, the main thread 220 may acquire system information and user data, may process the acquired system information and the acquired user data, and may provide the data manager 235 with the processed system information and the processed user data. In various embodiments, the main thread 220 may acquire information on the kernel 230 from the kernel 230, and may store and manage the acquired information on the kernel 230.

In various embodiments, the system analyzer 225 may collect information on a discharging history of a rechargeable battery (e.g. the battery 189) of the electronic device 101 and information on a charging history of the battery. For example, the system analyzer 225 may collect information on a usage pattern of the battery while the electronic device 101 is operated by power of the battery. For example, the system analyzer 225 may collect, as the information of the usage pattern of the battery, data of at least one among a discharge rate of the battery, the remaining level of the battery, the type of application causing the battery to be discharged, a period of time during which the battery is discharged, the load level of the processor 120, the maximum driving frequency of the processor 120, the maximum driving frequency of the memory 130, a cluster of the processor 120 used during the discharging of the battery, the brightness at which a screen is displayed on the display device 160, the resolution at which a screen is displayed on the display device 160, or a frame rate used to display a screen on the display device 160. In another example, in response to detecting that charging of a battery is initiated, the system analyzer 225 may collect information on at least one among a location of the charging of the battery, a period of time at which the battery has been discharged, the remaining level of the battery changed by the charging of the battery, the speed of the charging of the battery, or the magnitude of power (or voltage, current) supplied from the outside for the charging of the battery.

In various embodiments, the system analyzer 225 may collect, in each designated period, information on a discharging history of a rechargeable battery of the electronic device 101 and information on a charging history of the battery while the processor 120 is in a wake-up state. For example, the system analyzer 225 may collect, in each designated period, information on a discharging history of a rechargeable battery of the electronic device 101 and information on a charging history of the battery when the processor 120 is in a wake-up state, and may defer, cease, bypass, or forgo the collection when the processor 120 is in a sleep state. For example, the sleep state may include at least one of a state in which booting is used to switch the processor 120 to the wake-up state or a state in which booting is not used but the supply of steady state power is used to switch the processor 120 to the wake-up state. For example, the system analyzer 225 may restrict switching the processor 120 from the sleep state to the wake-up state for the collection and may perform the collection while the processor 120 is in the wake-up state. However, the information collection by the system analyzer 225 is not limited thereto. In various embodiments, data collected by the system analyzer 225 may be provided to the data manager 235 through the main thread 220, or may be directly provided to the data manager 235 without going through the main thread 220.

In various embodiments, the data manager 235 may configure a database based on the data provided from the main thread 220 (e.g. data collected by the system analyzer 225). For example, the data manager 235 may configure the database by performing indexing for data provided from the main thread 220. For example, the data manager 235 may configure the database by classifying data provided from the main thread 220. For example, the data manager 235 may configure the database such that fast searching for the database is supported.

In various embodiments, the data manager 235 may provide the inference engine 237 with training data acquired or generated based on the database. In various embodiments, the training data may be data used to train a model of the inference engine 237.

In various embodiments, the inference engine 237 may include the model for inference. In various embodiments, the inference engine 237 may train the model based on the training data received from the data manager 235. For example, the inference engine 237 may train the model by using the training data so as to provide a result having reliability equal to or higher than reference reliability to target data which are input to the inference engine 237.

In various embodiments, the inference engine 237 may receive the target data, and may apply the received target data to the model to acquire or generate an inference result. In various embodiments, the reliability of the inference result may be equal to or higher than the reference reliability when the model is a trained model. For example, by using the model, the inference engine 237 may predict a future charging pattern of the battery and a future discharging pattern of the battery based on past battery operating heuristics including the discharging history of the battery and the charging history of the battery. The inference engine 237 may provide the adjustment stage 240 with data regarding the inference result.

In various embodiments, the adjustment stage 240 may adjust a power management state based on the data regarding the inference result received from the inference engine 237. For example, the adjusted power management state may include a state in which the maximum driving frequency of the processor 120 is increased or decreased. For example, the adjusted power management state may include a state in which the state of at least one of clusters of the processor 120 is switched to a restricted state or a state in which the at least one cluster in the restricted state is switched to an available state. For example. For example, the adjusted power management state may include a state in which the maximum driving frequency of the memory 130 is increased or decreased. For example, the adjusted power management state may include a state in which the brightness of a screen displayed on the display device 160 is increased or decreased. For example, the adjusted power management state may include a state in which the resolution of a screen displayed on the display device 160 is increased or decreased. For example, the adjusted power management state may include a state in which a frame rate used to display a screen on the display device 160 is increased or decreased. For example, the adjusted power management state may include a state in which the color temperature of a screen displayed on the display device 160 is increased or decreased. For example, the adjusted power management state may include a state in which the communication module 190 is restricted from being used by at least one application executed in the background state among applications executed in the electronic device 101, or a state in which the restriction is released. For example, the adjusted power management state may include a state in which at least one of multiple communication techniques supported by the communication module 190 is restricted from being used, or a state in which the restriction is released. For example, the adjusted power management state may include a state in which the maximum load level of the processor 120 is increased or decreased. However, the adjusted power management state is not limited thereto. In various embodiments, the adjustment stage 240 may provide the control stage 270 with information on the adjusted power management state.

FIG. 2 illustrates an example in which the electronic device 101 or the processor 120 of the electronic device 101 includes the data manager 235, the inference engine 237, and the adjustment stage 240, but this is for the purpose of convenience in description. Depending on embodiments, at least one of the data manager 235, the inference engine 237, or the adjustment stage 240 may be included in at least one external electronic device (e.g. at least one server) different from the electronic device 101. When at least one of the data manager 235, the inference engine 237, or the adjustment stage 240 is included in at least one external electronic device, at least one among information or data provided from the system analyzer 225 to the data manager 235, information or data provided from the data manager 235 to the inference engine 237, or information or data provided from the inference engine 237 to the adjustment stage 240 may be transmitted to the external electronic device by using the communication module 190.

In various embodiments, the control stage 270 may receive information on the adjusted power management state from the adjustment stage 240. In various embodiments, the control stage 270 may control the elements of the electronic device 101 based on the information on the adjusted power management state. For example, the control stage 270 may increase or decrease the maximum driving frequency of the processor 120 based on the information on the adjusted power management state. For example, based on the information on the adjusted power management state, the control stage 270 may switch the state of at least one of clusters of the processor 120 to a restricted state or may switch the at least one cluster in the restricted state to an available state. For example, the control stage 270 may increase or decrease the maximum driving frequency of the memory 130 based on the information on the adjusted power management state. For example, based on the information on the adjusted power management state, the control stage 270 may increase or decrease the brightness of a screen displayed on the display device 160. For example, based on the information on the adjusted power management state, the control stage 270 may increase or decrease the resolution of a screen displayed on the display device 160. For example, based on the information on the adjusted power management state, the control stage 270 may increase or decrease a frame rate used to display a screen on the display device 160. For example, based on the information on the adjusted power management state, the control stage 270 may increase or decrease the color temperature of a screen displayed on the display device 160. For example, based on the information on the adjusted power management state, the control stage 270 may restrict the communication module 190 from being used by at least one application executed in the background state among applications executed in the electronic device 101, or may release the restriction. For example, based on the information on the adjusted power management state, the control stage 270 may restrict the use of at least one of multiple communication techniques supported by the communication module 190, or may release the restriction. For example, based on the information on the adjusted power management state, the control stage 270 may increase or decrease the maximum load level of the processor 120. However, the control stage 270 is not limited thereto.

FIG. 2 is merely one example of implementing adaptive power management according to various embodiments. In accordance with various embodiments, the adaptive power management may be implemented in a form different from FIG. 2.

Figure 3:
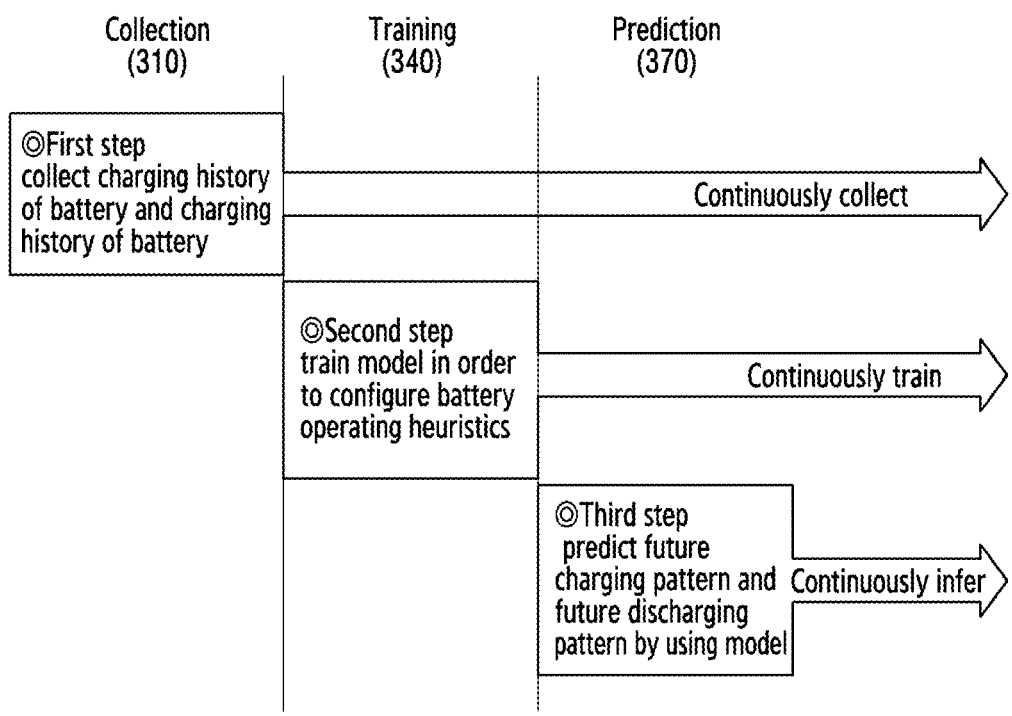
FIG. 3 illustrates an example of an inference operation for adaptive power management according to various embodiments.

FIG. 3 illustrates an example of an inference operation for adaptive power management according to various embodiments.

Figure 4:
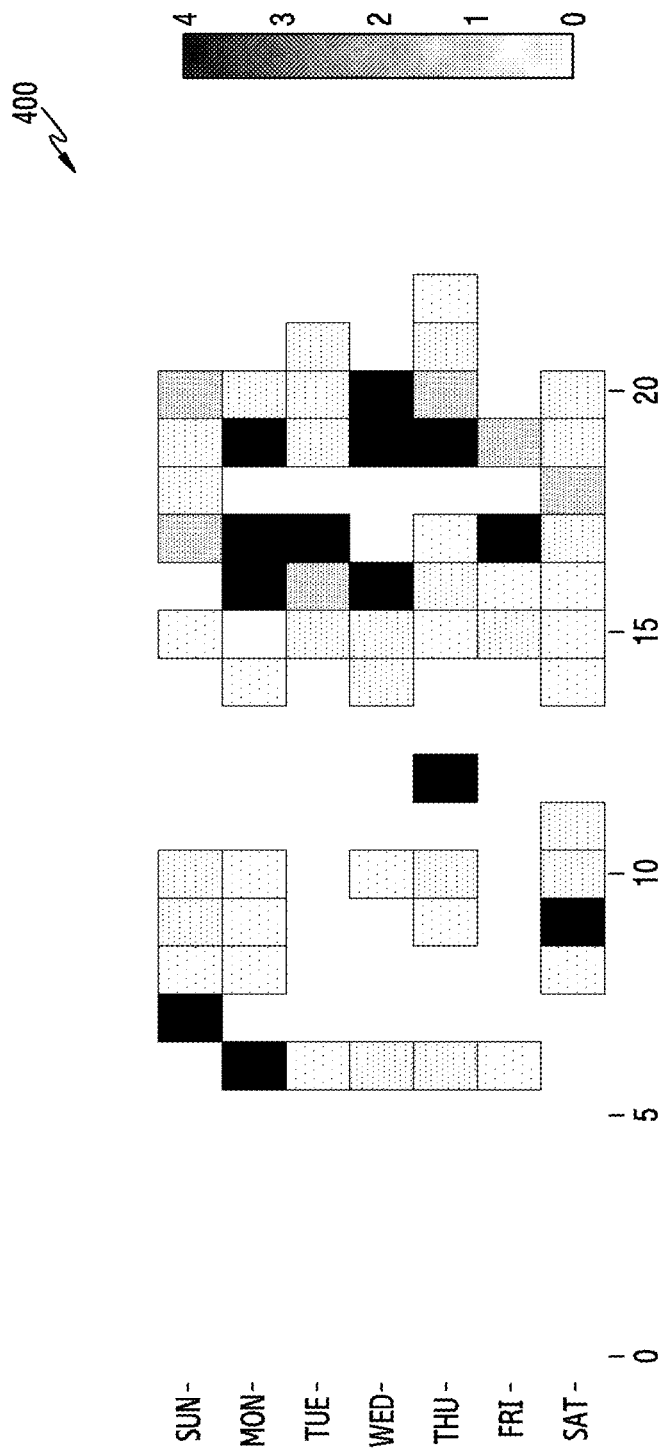
FIG. 4 illustrates an example of a database configured for adaptive power management according to various embodiments.

FIG. 4 illustrates an example of a database configured for adaptive power management according to various embodiments.

Figure 5:
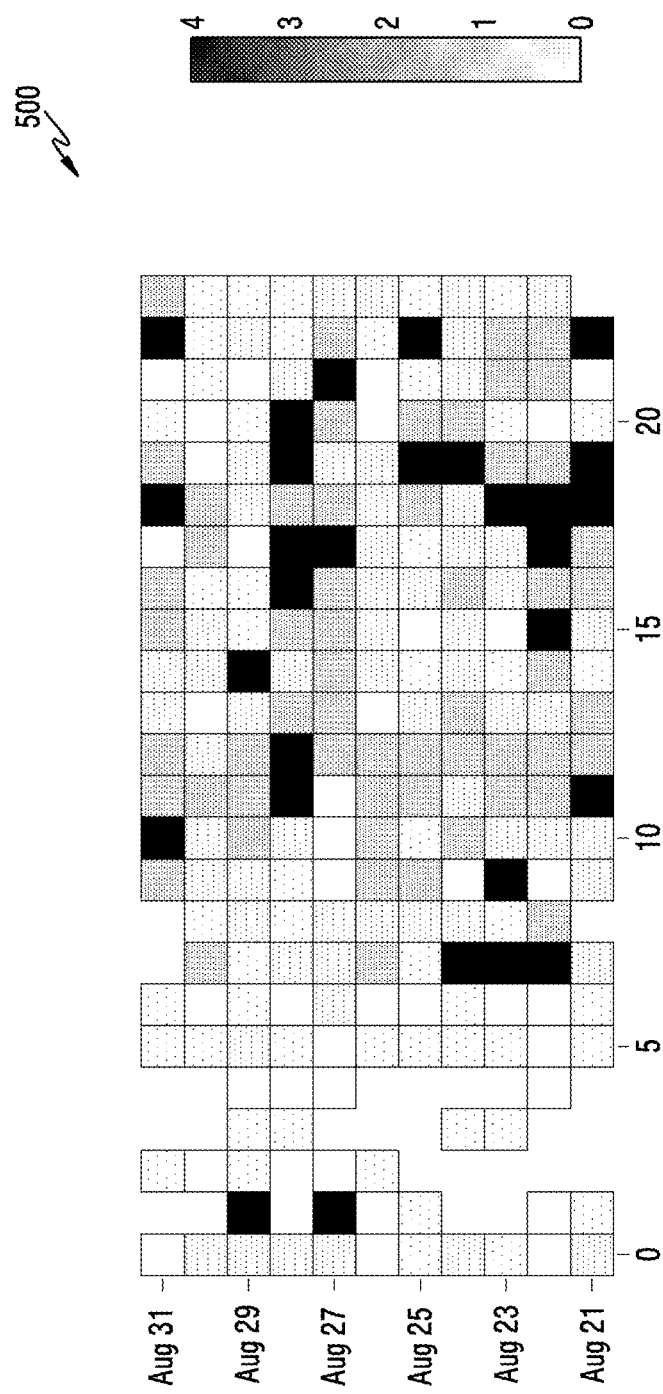
FIG. 5 illustrates another example of a database configured for adaptive power management according to various embodiments.

FIG. 5 illustrates another example of a database configured for adaptive power management according to various embodiments.

Figure 6:
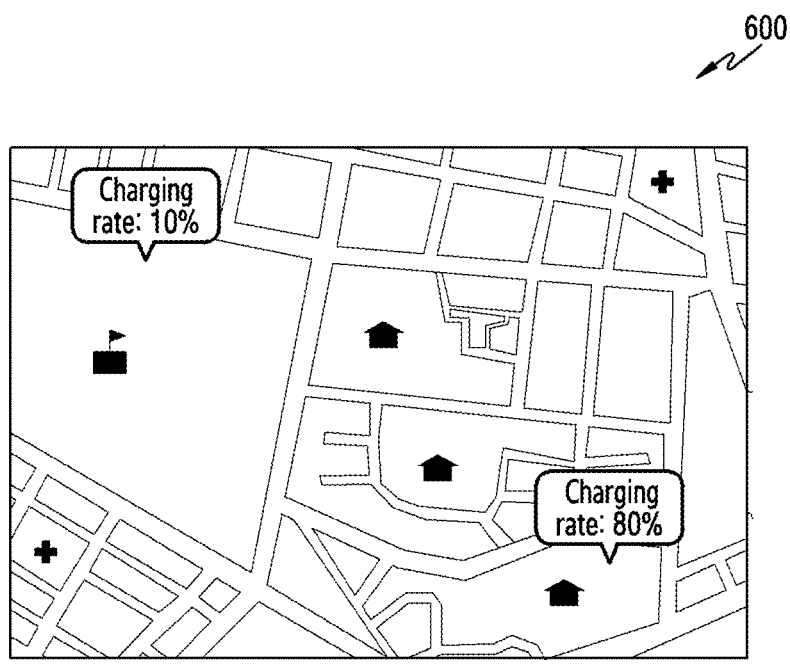
FIG. 6 illustrates another example of a database configured for adaptive power management according to various embodiments.

FIG. 6 illustrates another example of a database configured for adaptive power management according to various embodiments.

Figure 7:
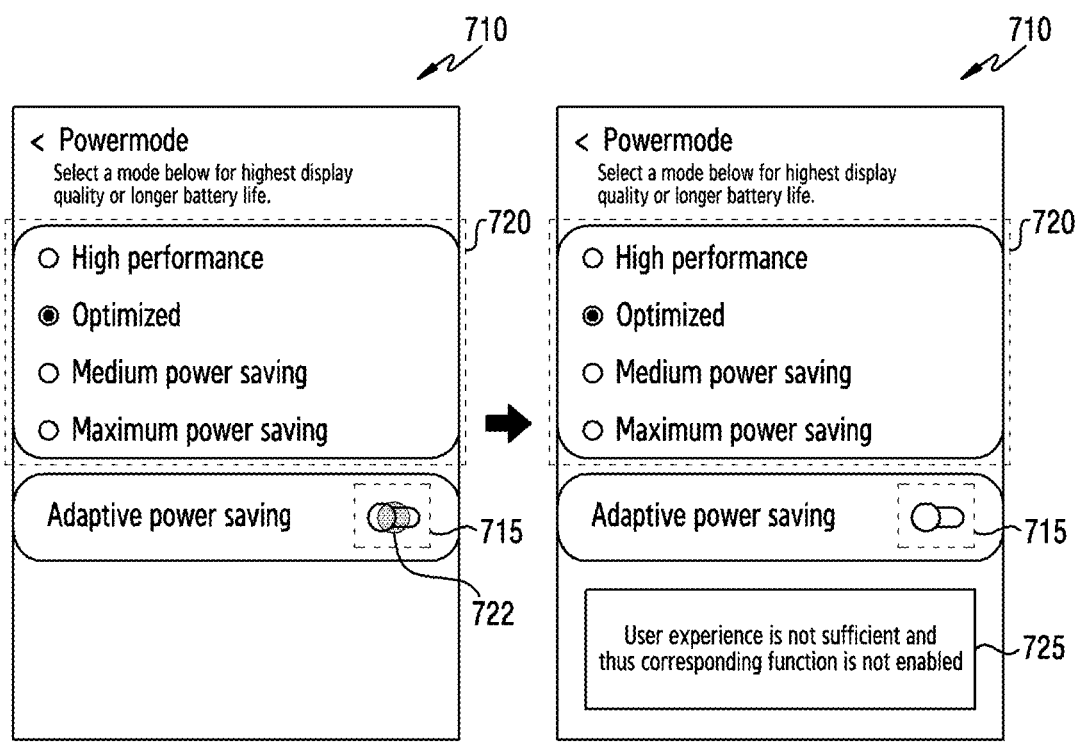
FIG. 7 illustrates an example of a user interface for providing adaptive power management service according to various embodiments.
Figure 8:
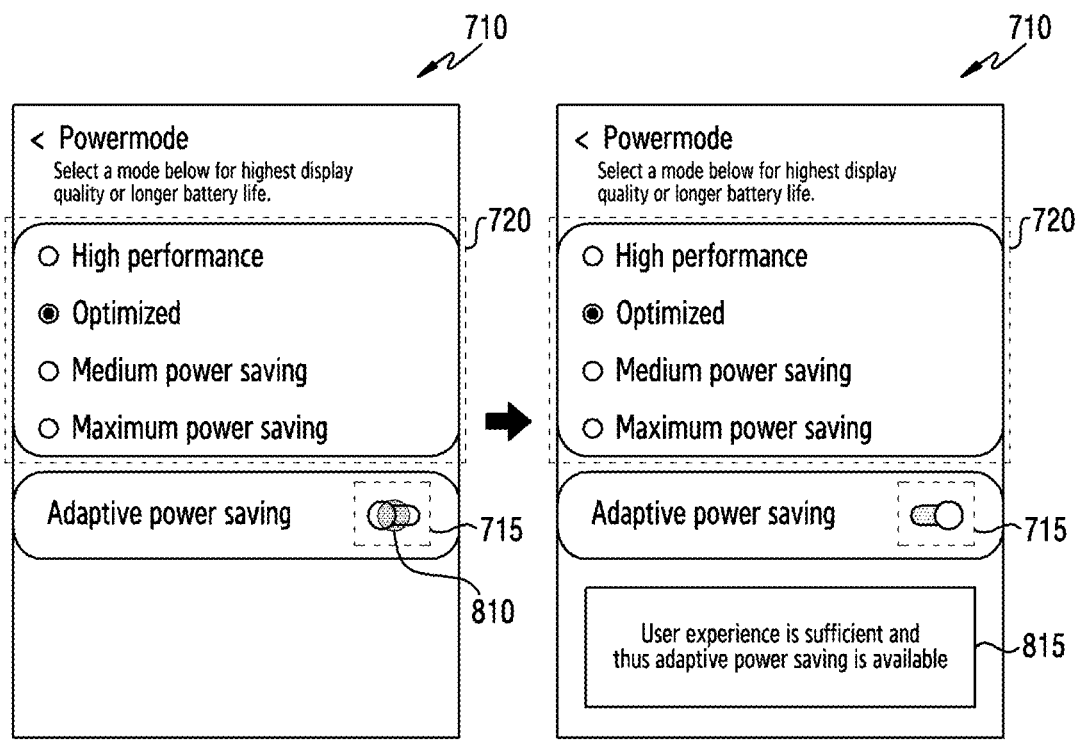
FIG. 8 illustrates an example of a user interface for providing adaptive power management service according to various embodiments.
Figure 9:
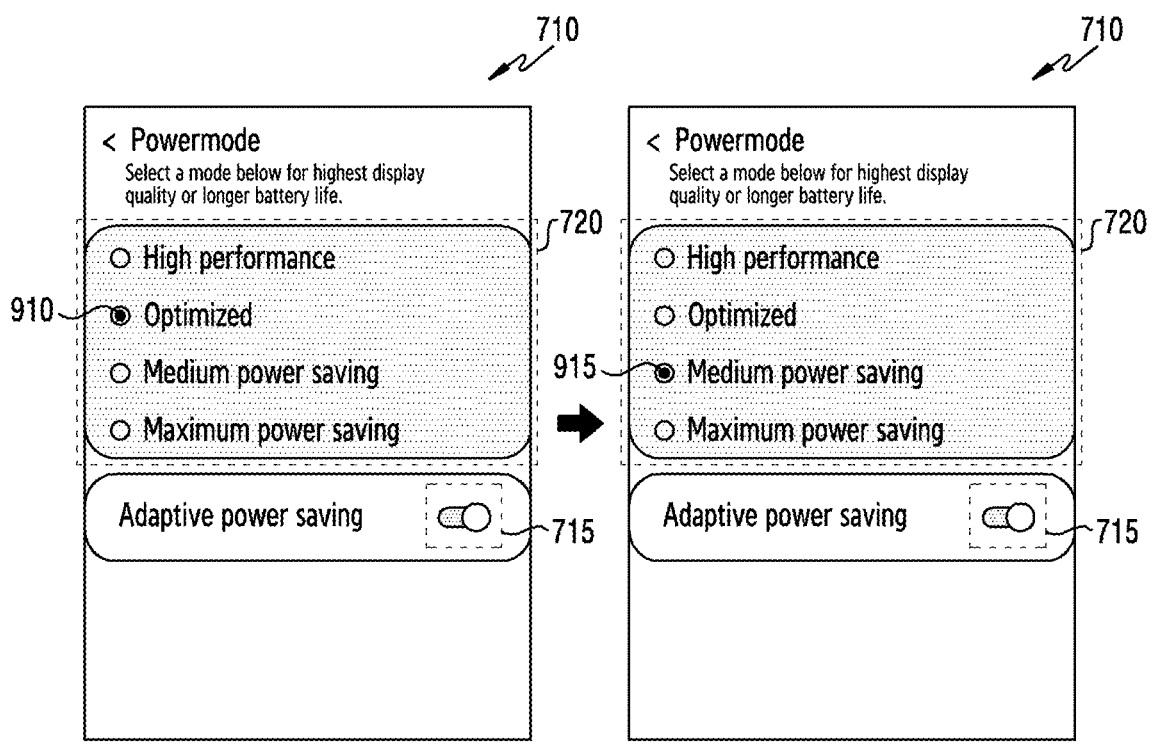
FIG. 9 illustrates an example of a user interface for providing adaptive power management service according to various embodiments.

FIG. 7 illustrates an example of a user interface for providing adaptive power management service according to various embodiments, FIG. 8 illustrates an example of a user interface for providing adaptive power management service according to various embodiments, and FIG. 9 illustrates an example of a user interface for providing adaptive power management service according to various embodiments.

Referring to FIG. 3, an inference operation for power management may be performed in the processor 120 illustrated in FIG. 1 or in a processor of an external electronic device linked with the electronic device 101.

The operation of FIG. 3 according to various embodiments will be described with reference to the elements of the adaptive power management system 200 in FIG. 2.

According to various embodiments, in collection 310, the processor 120 may collect information on a discharging history of the battery (or a usage pattern of the battery) and on a charging history of the battery. For example, as defined through the description of FIG. 2, the processor 120 may collect the information on the discharging history of the battery (or the usage pattern of the battery) and on the charging history of the battery by using the system analyzer 225. In various embodiments, the processor 120 may collect the information on the discharging history of the battery (or the usage pattern of the battery) and on the charging history of the battery when the processor 120 is in the wake-up state.

In various embodiments, the processor 120 may perform the collection in response to the detection that the electronic device 101 is linked with a charging device (e.g. a travel adapter (TA)).

The collected information may be provided to the main thread 220. In various embodiments, the processor 120 may parse the collected information, using the main thread 220, and may provide the parsed information to the data manager 235. In various embodiments, the processor 120 may process the parsed information in a designated format by using the data manager 235, and may store the processed information, thereby configuring a database. For example, the processor 120 may configure the database by chronologically storing the collected information (or the parsed information) or by classifying the collected information based on a location.

For example, the database may include at least one data regarding activities of a past system, activities of a past application, activities of the elements of the electronic device 101, or past battery levels. However, the database is not limited thereto.

In various embodiments, the processor 120 may identify whether a data accumulation rate connected in the collection 310 is sufficient to perform training, and may initiate training 340 based on identifying that the data accumulation rate is sufficient to perform the training. In various embodiments, the processor 120 may continuously perform the collection 310, independently of the initiation of the training 340.

In various embodiments, in the training 340, the processor 120 may train a model provided as an example through the description of FIG. 2. For example, the processor 120 may train the model by using the inference engine 237 in order to configure battery operating heuristics. For example, the processor 120 may train the model by using the database as training data. For example, the processor 120 may use a part of the training data (e.g. 70% of training data) for the training of the model, and may use the remaining part of the training data (e.g. 30% of training data) to test whether the reliability of a result inferred using the model is equal to or higher than a reference reliability.

In various embodiments, the processor 120 may initiate prediction 370 based on identifying that the reliability of a result in the test is equal to or higher than the reference reliability. In various embodiments, the processor 120 may continuously perform the collection 310 and the training 340, independently of the initiation of the prediction 370. In various embodiments, based on identifying that the reliability of a result in the test is lower than the reference reliability, the processor 120 may defer the initiation of the prediction 370 and continuously perform the collection 310 and the training 340 in order to increase the reliability.

In various embodiments, in the prediction 370, by using the model trained based on a charging history of the battery and a discharging history of the battery, the processor 120 may predict a future usage pattern of the battery based on the present usage pattern of the battery, and may adaptively adjust a power management state based on the predicted pattern. For example, the processor 120 may predict the future usage pattern of the battery by applying a database configured by the collection 310 and the training 340 to the model. For example, the database may store a charging pattern of the battery and a usage pattern of the battery as probability data. In various embodiments, the prediction 370 may be continuously performed while the reliability of a result derived based on the model is equal to or higher than reference reliability.

For example, referring to FIG. 4, the database may include data regarding a user's charging probability classified according to time as in a graph 400. The horizontal axis of the graph 400 may imply the time of day, and the vertical axis of the graph 400 may imply one week. A shadow included in the graph 400 may imply a charging probability according to time. The graph 400 is embodied in order to describe the database. The actual structure of the database may be configured in another format different from the graph 400. In various embodiments, based on the charging history of the battery acquired based on the collected data, the processor 120 may acquire, as in the graph 400, data regarding the probability that a user charges the battery according to time and may predict a future charging pattern of the battery based on the data acquired as in the graph 400. However, the description is not limited thereto.

In another example, referring to FIG. 5, as in a graph 500, the database may include data regarding a discharge rate of a battery or data regarding a discharge level of a battery, wherein the discharge rate or the discharge level is classified according to time. The horizontal axis of the graph 500 may imply the time of day, and the vertical axis of the graph 500 may imply one day. A shadow included in the graph 500 may imply a discharge rate of a battery according to time or a discharge level of a battery according to time. The graph 500 is embodied in order to describe the database. The actual structure of the database may be configured in another format (e.g. a table) different from the graph 500. In various embodiments, based on the discharging history of the battery acquired based on the collected data, the processor 120 may acquire, as in the graph 500, data regarding a pattern in which a user discharges the battery according to time, and may predict a future discharging pattern of the battery based on the data acquired as in the graph 500. However, the description is not limited thereto.

In another example, referring to FIG. 6, the database may include data regarding a probability of charging a battery according to place as in an image 600. The image 600 is embodied to describe the database. The actual structure of the database may be configured in another format different from the image 600. For example, in the collection 310, in response to detecting charging of the battery, the processor 120 may identify a location of the charging of the battery. For example, the processor 120 may identify a location of the electronic device as a location of the charging by using a GPS included in the electronic device 101 while the battery is discharged. In another example, the processor 120 may analyze a radio signal (e.g. a signal received based on a cellular communication technique, a signal received based on a Wi-Fi communication technique, or a signal received based on a Bluetooth communication technique) received by the electronic device 101 during charging of the battery, and may identify a location of the electronic device acquired based on the analysis result as a location of the charging. For example, the processor 120 may identify the location of the electronic device by acquiring, based on the analysis of the signal, identification information of another electronic device having transmitted the signal, may identify the location of the electronic device based on the received signal strength of the signal, or may identify the location of the electronic device based on the round trip time (RTT) of the signal. However, the description is not limited thereto. The processor 120 may configure the database by storing information on the identified location as information on a charging history of the battery. The processor 120 may acquire, based on the information on the charging history of the battery, data regarding a charging pattern of the battery according to place as in the image 600, and may predict the future charging pattern of the battery based on the acquired data. However, the description is not limited thereto.

In various embodiments, the processor 120 may display, on the display device 160, the fact that the prediction 370 is restricted from being performed, until the prediction 370 is initiated. For example, the processor 120 may receive a designated input. For example, the designated input may be an input for displaying a user interface for setting of power management of the electronic device 101. The processor 120 may display the user interface in response to the reception of the designated input. For example, referring to FIG. 7, the processor 120 may display a user interface 710 in response to the reception of the designated input. In various embodiments, the user interface 710 may include an object 715 for selecting whether to enable an adaptive power management state. In various embodiments, the user interface 710 may further include a list 720 of multiple power management states. In various embodiments, the list 720 may include objects indicating the multiple power management states that include: a high performance state in which a highest performance available in the electronic device 101 is provided; an optimized state (or a normal state) in which an optimized performance is provided; a medium power saving state in which a function of the electronic device 101 is restricted in order to reduce power consumption; and a maximum power saving state in which power consumption is further reduced than in the medium power saving state. For example, the high performance state may be a state in which: the brightness of a screen displayed on the display device 160 is increased by 10% compared with reference brightness; the maximum driving frequency of the processor 120 is maintained regardless of heat generation of the electronic device 101; the resolution of a screen displayed on the display device 160 is configured as wide quad high definition (WQHD); and there is no restriction on the use of the communication module 190. For example, the optimized state may be a state in which: the brightness of a screen displayed on the display device 160 is configured as user configuration brightness; the maximum driving frequency of the processor 120 is restricted when the heat generation of the electronic device 101 is equal to or higher than a threshold value; the resolution of a screen displayed on the display device 160 is configured as full high definition (FHD); and there is no restriction on the use of the communication module 190. For example, the medium power saving state may be a state in which: the brightness of a screen displayed on the display device 160 is decreased by 10% compared with reference brightness; the maximum driving frequency of the processor 120 is decreased to 70% of the maximum driving frequency; the resolution of a screen displayed on the display device 160 is configured as FHD; and an application executed in the background state is restricted from using the communication module 190. For example, the maximum power saving state may be a state in which: the brightness of a screen displayed on the display device 160 is decreased by 10% compared with reference brightness; the maximum driving frequency of the processor 120 is decreased to 70% of the maximum driving frequency; the resolution of a screen displayed on the display device 160 is configured as FHD; an application executed in the background state is restricted from using the communication module 190; and the color of a screen displayed on the display device 160 is configured by black and white. In various embodiments, based on receiving an input for selecting one of the objects indicating the multiple power management states in the list 720, the processor 120 may provide a power management state indicated by the selected object.

In various embodiments, in the state in which the prediction 370 is not initiated, the object 715 may be in a non-executable state in which the adaptive power management state is not provided. For example, while the list 720 and the object 715 are displayed within the user interface 710, the processor 120 may receive an input 722 for the object 715 in the state in which the prediction 370 is not initiated. In response to the reception of the input 722, the processor 120 may identify that the prediction 370 is not yet initiated. The processor 120 may display a message 725 based on the identification. For example, the message 725 may include a text guiding or indicating that a model is not sufficiently trained (e.g. "a user's experience is not sufficient and thus the corresponding function is not enabled"). The message 725 may disappear after a designated time passes. Since the object 715 is in the non-executable state in which the adaptive power management state is not provided in the state in which the prediction 370 is not initiated, the processor 120 may maintain a first state indicating that the adaptive power management state is disabled.

In another example, referring to FIG. 8, while the list 720 and the object 715 are displayed within the user interface 710, the processor 120 may receive an input 810 for the object 715 in the state in which the prediction 370 is initiated. In response to the reception of the input 810, the processor 120 may identify that the prediction 370 is initiated. The processor 120 may display a message 815 based on the identification. For example, the message 815 may include a text indicating that a model is sufficiently trained and thus an adaptive power management state is provided (e.g. "a user's experience is sufficient and thus adaptive power saving is usable"). The message 815 may disappear after a designated time passes. The object 715 may be switched from the first state to a second state indicating that the adaptive power management state is enabled.

In another various, the processor 120 may display, on the display device 160, a power management state currently provided among the multiple power management states while the adaptive power management state is enabled. For example, referring to FIG. 9, the processor 120 may display the list 720, which is represented as being disabled, together with the object 715 in the second state while the adaptive power management state is enabled. While the adaptive power management state is enabled, the list 720 may be displayed in a translucent state for indicating that a user input for selecting one of the multiple power management states is restricted. In various embodiments, the processor 120 may display a currently provided power management state while the adaptive power management state is enabled in the list. For example, when an optimized state is selected from the multiple power management states while the adaptive power management state is enabled, the processor 120 may display a visual element 910 indicating that the optimized state is selected in the list 720. For example, when a medium power saving state is selected from the multiple power management states while the adaptive power management state is enabled, the processor 120 may display a visual element 915 indicating that the medium power saving state is selected in the list 720. However, the description is not limited thereto.

Figure 10:
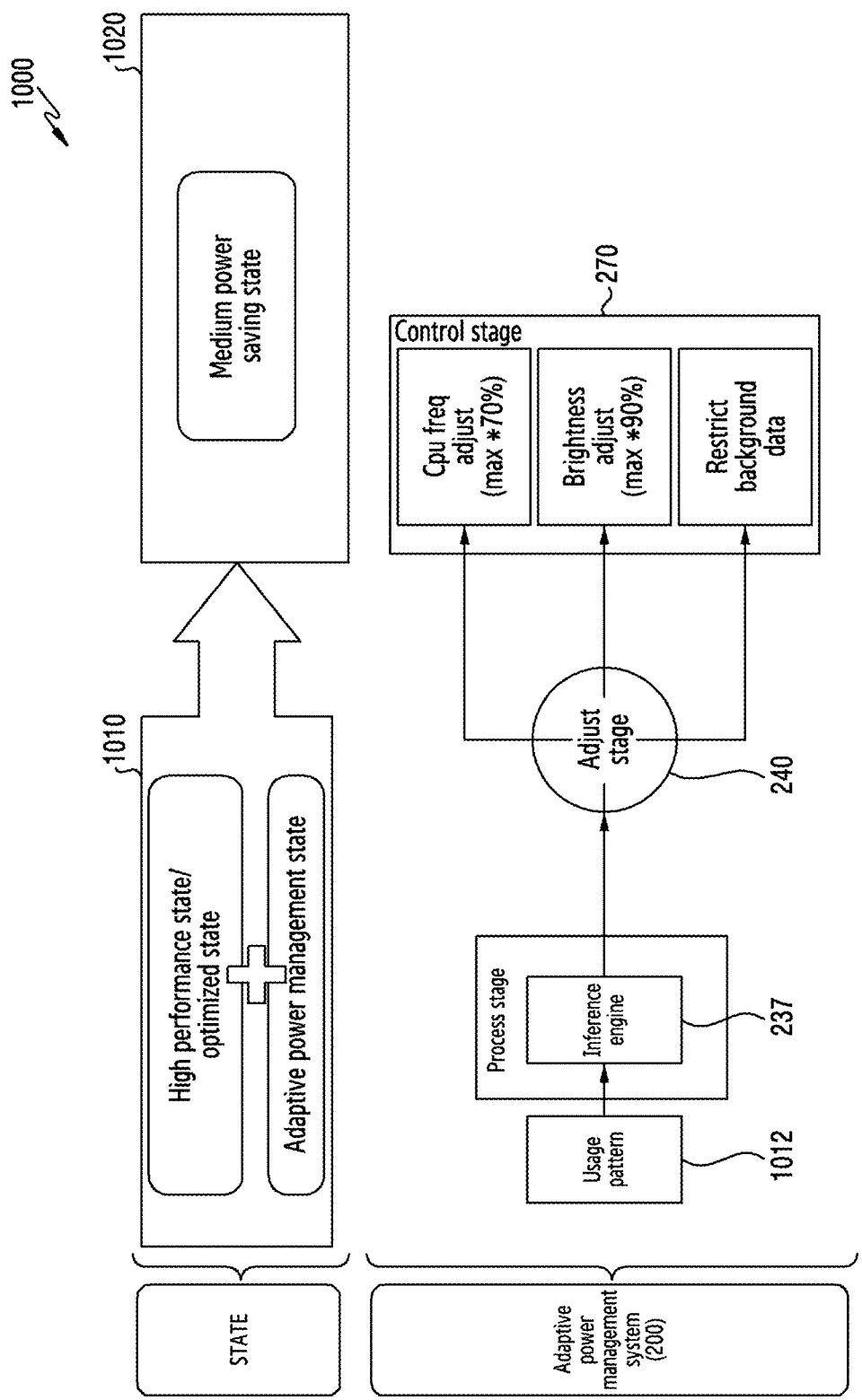
FIG. 10 illustrates an example of an operation of an electronic device for providing adaptive power management according to various embodiments.

FIG. 10 illustrates an example of an operation of the electronic device 101 for providing adaptive power management according to various embodiments. The operation of FIG. 10 may be performed by the processor 120 illustrated in FIG. 1.

Referring to FIG. 10, an illustration 1000 illustrates a state of the electronic device 101 and an operation of the adaptive power management system 200 with a link therebetween. In various embodiments, as in a state 1010, the processor 120 may receive an input for enabling an adaptive power management state while providing a high performance state or an optimized state. The processor 120 may monitor a usage pattern 1012 of a battery in response to the reception of the input, and may provide the usage pattern 1012 of the battery to the inference engine 237 of the process stage 210. The processor 120 may determine, using the inference engine 237, whether the usage pattern 1012 is different from a reference pattern derived from a model trained based on a discharging history of the battery and a charging history of the battery. For example, when the difference between data indicating the usage pattern 1012 and data indicating the reference pattern is within a reference range, the processor 120 may determine that the usage pattern 1012 corresponds to the reference pattern. In another example, when the difference between data indicating the usage pattern 1012 and data indicating the reference pattern is beyond a reference range, the processor 120 may determine that the usage pattern 1012 is different from the reference pattern. Based on determining that the usage pattern 1012 is different from the reference pattern, the processor 120 may adjust a power management state from the high performance state or the optimized state to another power management state by using the adjustment stage 240. For example, as in a state 1020, the processor 120 may switch a power management state to a medium power saving state by using the adjustment stage 240. While the medium power saving state is provided as in the state 1020, the processor 120 may use the control stage 270 to: adjust the maximum driving frequency (CPU freq.) of the processor 120 to decrease to 70% of the maximum driving frequency; adjust the brightness of a screen displayed on the display device 160 to decrease to 90% of the maximum brightness; and restrict an application executed in the background state from using the communication module 190.

Figure 11A:
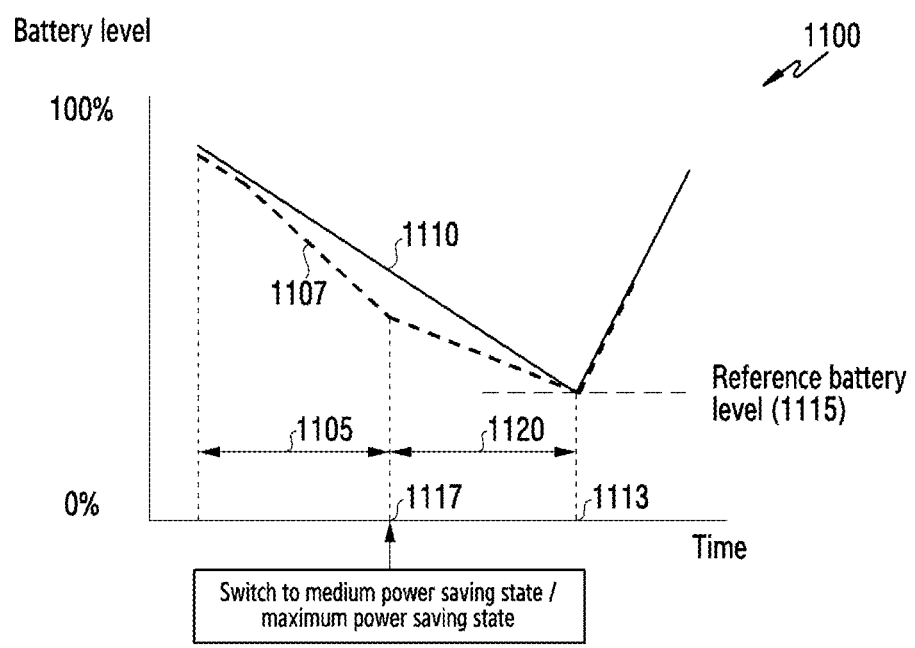
FIG. 11A illustrates another example of an operation of an electronic device for providing adaptive power management according to various embodiments.
Figure 11B:
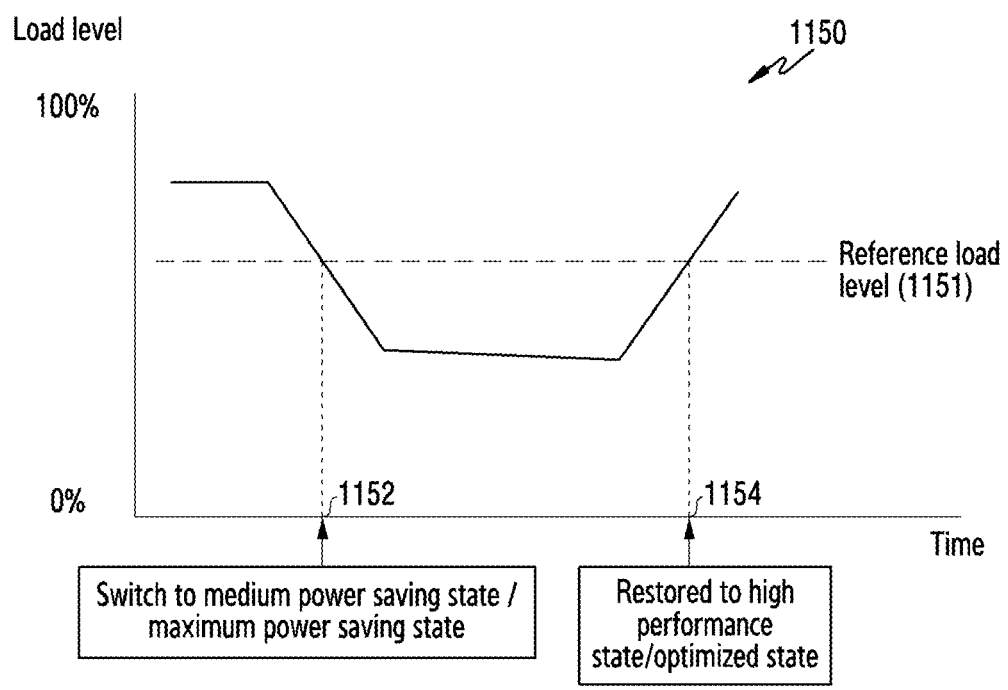
FIG. 11B illustrates another example of an operation of an electronic device or providing adaptive power management according to various embodiments.

FIG. 11A illustrates another example of an operation of the electronic device 101 for providing adaptive power management according to various embodiments, and FIG. 11B illustrates another example of an operation of the electronic device 101 for providing adaptive power management according to various embodiments. The operation of FIG. 11 may be performed by the processor 120 illustrated in FIG. 1.

Referring to FIG. 11A, the horizontal axis of a graph 1100 may imply time, and the vertical axis of the graph 1100 may imply a battery level. The processor 120 may monitor a usage pattern 1107 of a rechargeable battery of the electronic device 101 during a period of time 1105. For example, the processor 120 may monitor the usage pattern 1107 of the battery while the electronic device 101 operates based on a high performance state or an optimized state. The processor 120 may identify that the monitored usage pattern 1107 is different from a reference pattern 1110. For example, by applying the monitored usage pattern 1107 to a model trained based on a charging history of the battery and a discharging history of the battery, the processor 120 may predict that the level of the battery will reach a reference battery level 1115 before a time point 1113 at which the battery is estimated to be charged. The processor 120 may switch, based on the prediction, the high performance state or the optimized state to a medium power saving state or a maximum power saving state at a time point 1117. The processor 120 may provide the medium power saving state or the maximum power saving state during a period of time 1120. The processor 120 may detect charging of the battery at the time point 1113. In response to the detection, the processor 120 may restore the medium power saving state or the maximum power saving state to the high performance state or the optimized state.

In various embodiments, unlike the illustration of FIG. 11A, the processor 120 may adaptively change a power management state based on the difference between the present battery level and a battery use level estimated based on the model, independently of the multiple power management states. For example, based on identifying that the difference is smaller than the reference battery level, the processor 120 may configure the maximum driving frequency of the processor 120 to be 95%, may configure the maximum driving frequency of the memory 130 to be 95%, and may configure the brightness of a screen displayed on the display device 160 to be 97%. In another example, based on identifying that the difference is smaller than 95% of the reference battery level, the processor 120 may configure the maximum driving frequency thereof to be 85%, may configure the maximum driving frequency of the memory 130 to be 85%, and may configure the brightness of a screen displayed on the display device 160 to be 94%. In another example, based on identifying that the difference is smaller than 90% of the reference battery level, the processor 120 may configure the maximum driving frequency thereof to be 75%, may configure the maximum driving frequency of the memory 130 to be 75%, and may configure the brightness of a screen displayed on the display device 160 to be 91%. In another example, based on identifying that the difference is smaller than 80% of the reference battery level, the processor 120 may configure the maximum driving frequency thereof to be 70%, may configure the maximum driving frequency of the memory 130 to be 70%, may configure the brightness of a screen displayed on the display device 160 to be 90%, and may restrict the use of a high-performance cluster among clusters of the processor 120. In another example, based on identifying that the difference is larger than the reference battery level, the processor 120 may configure the maximum driving frequency thereof to be 100%, may increase the maximum driving frequency of the memory 130 to 100%, may configure the brightness of a screen displayed on the display device 160 to be 100%, and may allow the use of a high-performance cluster among clusters of the processor 120. In another example, based on identifying that the difference is larger than 95% of the reference battery level, the processor 120 may configure the maximum driving frequency of the processor 120 to be 95%, may configure the maximum driving frequency of the memory 130 to be 100%, may configure the brightness of a screen displayed on the display device 160 to be 100%, and may allow the use of a high-performance cluster among clusters of the processor 120. In another example, based on identifying that the difference is larger than 90% of the reference battery level, the processor 120 may configure the maximum driving frequency of the processor 120 to be 85%, may configure the maximum driving frequency of the memory 130 to be 85%, may configure the brightness of a screen displayed on the display device 160 to be 94%, and may allow the use of a high-performance cluster of the processor 120. However, the description is not limited thereto.

Referring to FIG. 11B, the horizontal axis of a graph 1150 may imply time, and the vertical axis of the graph 1150 may imply a load level of the processor 120. The processor 120 may identify that the load level of the processor 120 estimated using the model becomes lower than a reference load level 1151 from a time point 1152. The reference load level 1151 may be defined in the electronic device 101 in order to predict or identify whether the electronic device 101 is in a state in which a high performance is required to be provided. The processor 120 may switch, based on the identification, the power management state of the electronic device 101 from a high performance state or an optimized state to a medium power saving state or a maximum power saving state. The processor 120 may monitor a load level of the processor 120 after the switching, and may identify that the load level of the processor 120 estimated using the monitored load level and the model becomes higher than the reference load level 1151 from a time point 1154. The processor 120 may restore, based on the identification, the medium power saving state or the maximum power saving state to the high performance state or the optimized state.

Figure 12:
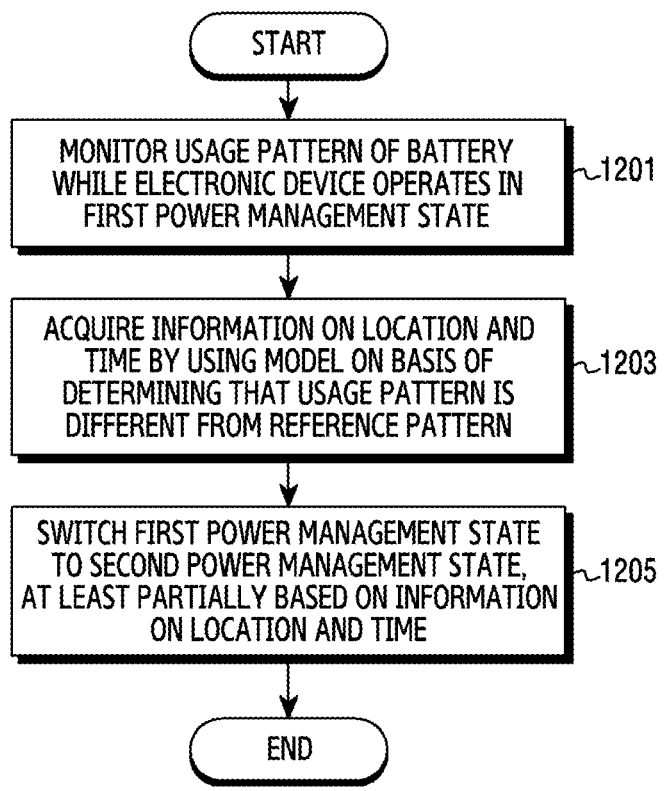
FIG. 12 is a flow diagram illustrating a method for providing an adaptive power management state according to various embodiments.

FIG. 12 is a flow diagram illustrating a method for providing an adaptive power management state according to various embodiments. This method may be performed by the electronic device 101 or the processor 120 of the electronic device 101 illustrated in FIG. 1.

The operations of FIG. 12 according to various embodiments will be described with reference to the elements of the electronic device 101 in FIG. 1.

Referring to FIG. 12, in accordance with various embodiments, operation 1201, the processor 120 may monitor a usage pattern of a rechargeable battery of the electronic device 101 while the electronic device 101 operates in a first power management state. In various embodiments, the first power management state may include a state in which the processor 120 is driven based on a first maximum driving frequency. In various embodiments, the first power management state may further include a state in which the memory 130 is driven based on a third maximum driving frequency. In various embodiments, the first power management state may further include a state in which a screen is displayed on the display device 160 at a first brightness. In various embodiments, the first power management state may further include a state in which a screen is displayed on the display device 160 based on a first frame rate. In various embodiments, the first power management state may further include a state in which a screen is displayed on the display device 160 at a first resolution. In various embodiments, the first power management state may further include a state in which a high-performance cluster among multiple clusters of the processor 120 is allowed to be used. However, the description is not limited thereto.

According to various embodiments, in operation 1203, based on determining that the usage pattern of the battery is different from a reference pattern, the processor 120 may acquire, using a model, information on a location in which the battery is estimated to be charged and information on a time at which the battery is estimated to be charged. In various embodiments, the model may be a model trained based on a discharging history of the battery and a charging history of the battery. In various embodiments, the model may be a model configured to provide a result having reliability equal to or higher than reference reliability to input target data. In various embodiments, the model may be configured to predict a future charging pattern of the battery and a future discharging pattern of the battery based on past battery operating heuristics including the discharging history of the battery and the charging history of the battery. For example, the processor 120 may determine that the usage pattern of the battery is different from the reference pattern derived from the model. For example, the processor 120 may compare data indicating the usage pattern of the battery with data indicating the reference pattern, may determine, based on the result of the comparison, that the difference between the data indicating the usage pattern of the battery and the data indicating the reference pattern is beyond a reference range, and may determine, based on the determination, that the usage pattern is different from the reference pattern. The model has been trained based on the discharging history of the battery of the charging history of the battery. Thus, the processor 120 may perform inference by using the model based on the determination, and may acquire, as a result of the inference, information on a location in which the battery is estimated to be charged and information on a time at which the battery is estimated to be charged.

According to various embodiments, in operation 1205, the processor 120 may switch the first power management state to a second power management state different from the first power management state, at least based on the information on the location and the information on the time. For example, the processor 120 may acquire information on the present location of the electronic device 101 by using a location measurement circuitry (e.g. the communication module 190), and may compare the present location of the electronic device 101 with the location which is acquired from the model and in which the battery is estimated to be charged. For example, the processor 120 may switch the first power management state to the second power management state based on the distance between the present location of the electronic device 101 and the location in which the battery is estimated to be charged. For example, the processor 120 may compare the present time with the time at which the battery is estimated to be charged. For example, the processor 120 may switch the first power management state to the second power management state based on the difference between the present time and the time at which the battery is estimated to be charged. In various embodiments, the second power management state may include a state in which the processor 120 is driven based on a second maximum driving frequency lower than the first maximum driving frequency. In various embodiments, the second power management state may further include a state in which the memory is driven based on a fourth maximum driving frequency lower than the third maximum driving frequency. In various embodiments, the second power management state may further include a state in which a screen is displayed on the display device 160 at a second brightness lower than the first brightness. In various embodiments, the second power management state may further include a state in which a screen is displayed on the display device 160 based on a second frame rate lower than the first frame rate. In various embodiments, the second power management state may further include a state in which a screen is displayed on the display device 160 at a second resolution lower than the first resolution. In various embodiments, the second power management state may further include a state in which the use of the high-performance cluster among the multiple clusters is restricted. However, the description is not limited thereto.

As described above, when it is determined, using a trained model, that the usage pattern of the electronic device 101 is different from of a reference pattern, the electronic device 101 according to various embodiments may provide a power management service satisfying a user preference by determining whether to switch a power management state based on a location in which the battery is estimated to be charged and a time at which the battery is estimated to be charged.

Figure 13:
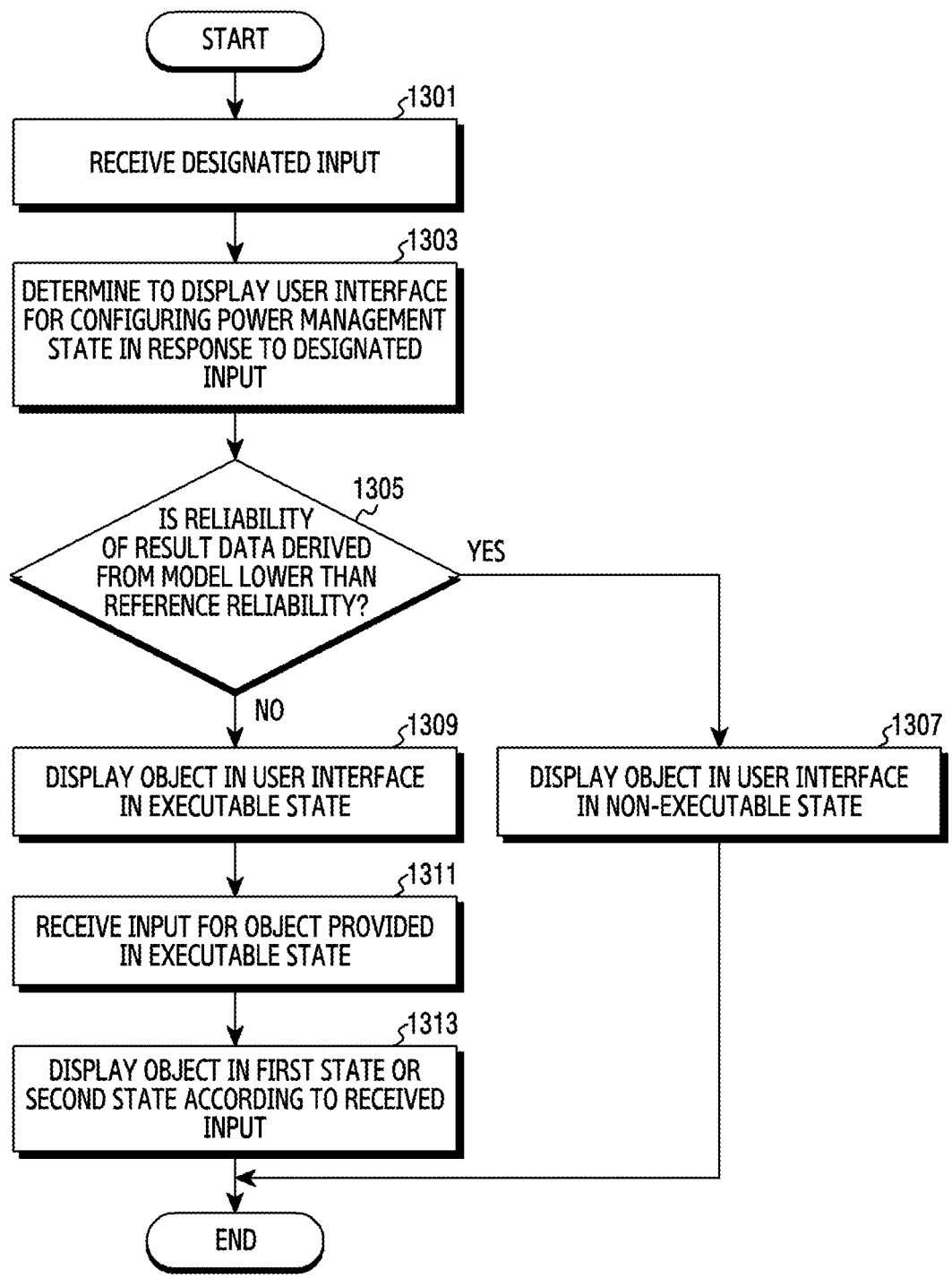
FIG. 13 is a flow diagram illustrating a method for controlling an object for providing adaptive power management according to various embodiments.

FIG. 13 is a flow diagram illustrating a method for controlling an object for providing adaptive power management according to various embodiments. This method may be performed by the electronic device 101 or the processor 120 of the electronic device 101 illustrated in FIG. 1.

The operations of FIG. 13 according to various embodiments will be described with reference to the elements of the electronic device 101 in FIG. 1.

Referring to FIG. 13, according to various embodiments, in operation 1301, the processor 120 may receive a designated input. For example, the designated input may be an input for invoking a user interface (e.g. the user interface 710 in FIG. 7) for setting a power management state. For example, the designated input may be configured as a force touch input, a hovering input, or a touch input on the display device 160, may be configured as a voice input received through a microphone of the electronic device 101, or may be configured as a pressing input on a physical button exposed through a housing of the electronic device 101. However, the designated input is not limited thereto.

In operation 1303, in response to the designated input, the processor 120 may determine to display the user interface for setting the power management state. In various embodiments, the user interface may include an object (e.g. the object 715 in FIG. 7) for selecting whether to enable an adaptive power management state in which the model is used to adaptively select one from among multiple power management states including a first power management state and a second power management state. For example, the first power management state and the second power management state may imply power management states defined through the description regarding the FIG. 12. In various embodiments, the user interface may display, together with the object, a list (e.g. the list 720 in FIG. 7) including multiple objects for indicating the multiple power management states, respectively.

According to various embodiments, in operation 1305, the processor 120 may identify, based on the determination, whether the reliability of result data derived from the model is lower than reference reliability. For example, in order to determine how the state of the object is displayed, the processor 120 may identify whether the reliability of result data derived from the model is lower than reference reliability. When the reliability of the result data is lower than the reference reliability ("Yes"), the processor 120 may perform operation 1307. Otherwise ("No"), the processor 120 may perform operation 1309.

According to various embodiments, in operation 1307, the processor 120 may display the object in the user interface in a non-executable state based on the identification that the reliability of the result data is lower than the reference reliability ("Yes"). In various embodiments, the non-executable state of the object may imply a state in which the execution of the adaptive power management state through an input for the object is prohibited, deferred, or restricted. Although not illustrated in FIG. 13, in various embodiments, based on reception of the input for the object in the non-executable state, the processor 120 may display a message which guides the state in which the execution of the adaptive power management state is prohibited, deferred, or restricted as in the message 725 of FIG. 7.

According to various embodiments, in operation 1309, the processor 120 may display the object in the user interface in an executable state based on the identification that the reliability of the result data is equal to or higher than the reference reliability ("No").

According to various embodiments, in operation 1311, the processor 120 may receive an input for the object provided in the executable state.

According to various embodiments, in operation 1313, in response to the received input, the processor 120 may display the object, provided in the executable state according to the received input, in a first state indicating that the adaptive power management state is disabled or in a second state indicating that the adaptive power management state is enabled. For example, when the adaptive power management state is enabled, the processor 120 may display, in response to the input, the object in the first state (e.g. the object 715 in a first state of FIG. 8) so as to disable the adaptive power management state. In another example, when the adaptive power management state is disabled, the processor 120 may display, in response to the input, the object in the second state (e.g. the object 715 in a second state of FIG. 9) so as to enable the adaptive power management state. Although not illustrated in FIG. 13, in various embodiments, based on reception of an input for the object in the executable state, the processor 120 may display a message which guides that the adaptive power management state can be enabled as in the message 815 of FIG. 8.

As described above, the electronic device 101 according to various embodiments may change the representation of an object in a user interface for setting a power management state, thereby indicating whether to enable an adaptive power management state. The electronic device 101 according to various embodiments may provide an enhanced user experience through the indication.

Figure 14:
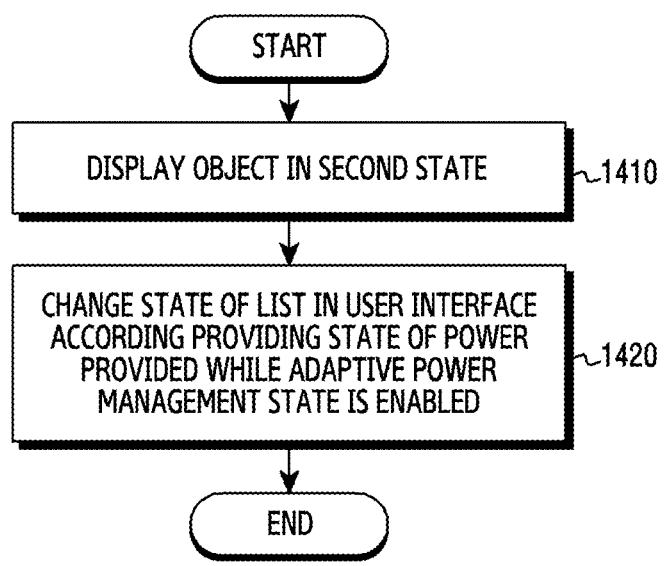
FIG. 14 is a flow diagram illustrating a method for changing a state of a list within a user interface depending on a power management state provided in an adaptive power management state according to various embodiments.

FIG. 14 is a flow diagram illustrating a method for changing a state of a list within a user interface depending on a power management state provided in an adaptive power management state according to various embodiments. This method may be performed by the electronic device 101 or the processor 120 of the electronic device 101 illustrated in FIG. 1.

The operations of the FIG. 14 according to various embodiments will be described with reference to the elements of the electronic device 101 in FIG. 1.

Referring to FIG. 14, in accordance with various embodiments, in operation 1410, the processor 120 may display an object in a second state. The second state may be a second state defined through the description regarding FIG. 13.

According to various embodiments, in operation 1420, the processor 120 may change a state of a list (e.g. the list 720 in FIG. 9) in a user interface depending on a providing state of power provided during enabling an adaptive power management state. For example, when the electronic device 101 is in the first power management state during enabling the adaptive power management state, the processor 120 may display, in the list, the fact that the first power management state is selected from among multiple power management states indicated by multiple objects in the list (e.g. the visual element 910 if FIG. 9). In another example, when the electronic device 101 is in the second power management state changed from the first power management state during enabling the adaptive power management state, the processor 120 may display, in the list, the fact that the second power management state changed from the first power management state is selected from among the multiple power management states (e.g. the visual element 915 in FIG. 9).

As described above, the electronic device 101 according to various embodiments may display, while an adaptive power management state is enabled, a power management state provided by the adaptive power management state in a list in a user interface for setting a power management state, thereby providing an enhanced user experience.

Figure 15:
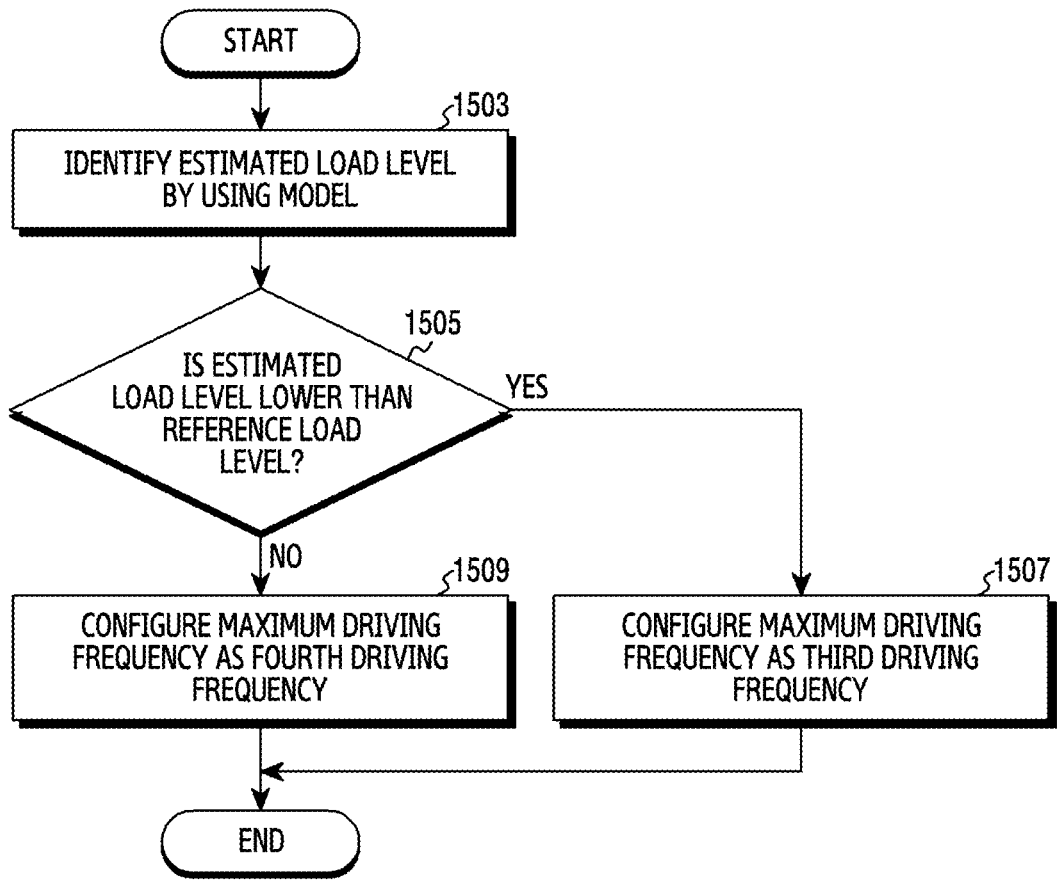
FIG. 15 is a flow diagram illustrating a method for configuring a maximum driving frequency of a processor based on adaptive power management according to various embodiments.

FIG. 15 is a flow diagram illustrating a method for configuring a maximum driving frequency of a processor based on adaptive power management according to various embodiments. This method may be performed by the electronic device 101 or the processor 120 of the electronic device 101 illustrated in FIG. 1.

The operations of FIG. 15 according to various embodiments will be described with reference to the elements of the electronic device 101 in FIG. 1.

Referring to FIG. 15, in accordance with various embodiments, in operation 1503, the processor 120 may identify an estimated load level of the processor 120 by using a model. For example, based on information on a load level of the processor 120 included in a charging history of the battery and a discharging history of the battery, the processor 120 may identify the estimated load level of the processor 120 by using the model.

According to various embodiments, in operation 1505, the processor 120 may determine whether the estimated load level is lower than a reference load level. For example, the reference load level may be a level defined in the electronic device 101 in order to identify whether the state of the electronic device 101 is a state in which a high performance calculation is required. In various embodiments, the reference load level may be adaptively changed according to the state of the battery. In various embodiments, the reference load level may be changed according to user setting. In various embodiments, when the estimated load level is lower than the reference load level ("Yes"), the processor 120 may perform operation 1507. Otherwise ("No"), the processor 120 may perform operation 1509.

According to various embodiments, in operation 1507, the processor 120 may configure the maximum driving frequency of the processor 120 as a third driving frequency based on the determination that the estimated load level is lower than the reference load level ("Yes"). Based on configuring the maximum driving frequency as the third driving frequency, the processor 120 may use frequencies ranging from zero to the third driving frequency as a driving frequency of the processor 120.

According to various embodiments, in operation 1509, the processor 120 may configure the maximum driving frequency of the processor 120 as a fourth driving frequency higher than the third driving frequency based on the determination that the estimated load level is equal to or higher than the reference load level ("No"). The fact that the estimated load level is equal to or higher than the reference load level may imply a state in which a high performance calculation is required in the electronic device 101. Thus, the processor 120 may configure the maximum driving frequency of the processor 120 as the fourth driving frequency higher than the third driving frequency. Based on configuring the maximum driving frequency as the fourth driving frequency, the processor 120 may use frequencies ranging from zero to the fourth driving frequency as a driving frequency of the processor 120.

As described above, the electronic device 101 according to various embodiments may adaptively change the maximum driving frequency of the processor 120 according to an estimated load level by using a model, thereby reducing power consumption when a high performance calculation is not required.

Figure 16:
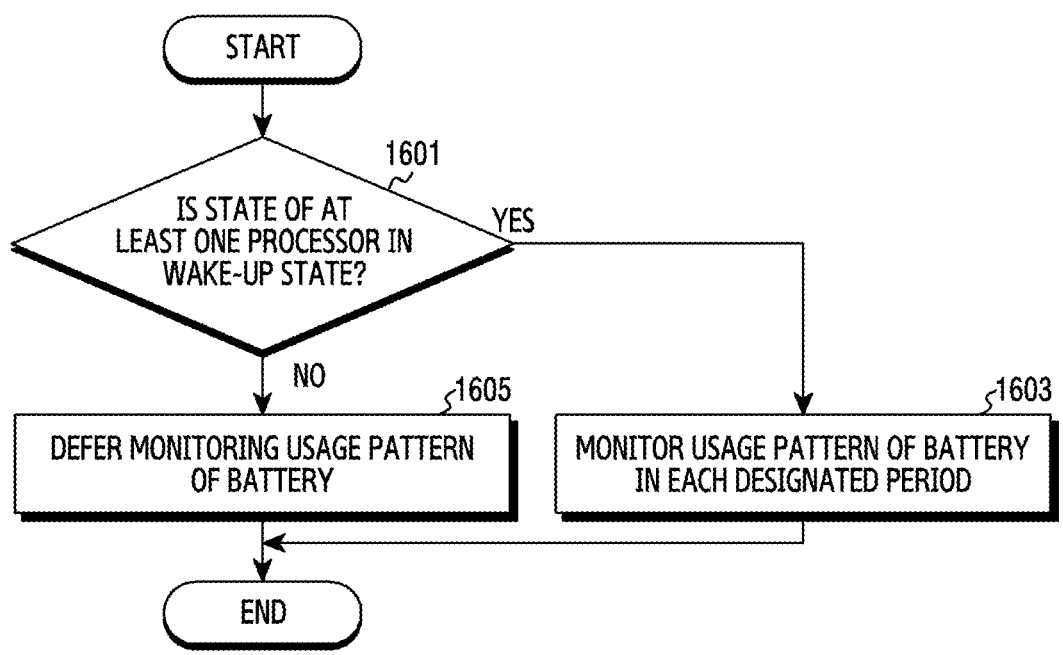
FIG. 16 is a flow diagram illustrating a method for monitoring a usage pattern of a battery according to various embodiments.

FIG. 16 is a flow diagram illustrating a method for monitoring a usage pattern of a battery according to various embodiments. This method may be performed by the electronic device 101 or the processor 120 of the electronic device 101 illustrated in FIG. 1.

The operations of FIG. 16 according to various embodiments will be described with reference to the elements of the electronic device 101 in FIG. 1.

Referring to FIG. 16, in accordance with various embodiments, in operation 1601, the processor 120 may identify whether the processor 120 is in a wake-up state. In order to reduce power consumption for monitoring a usage pattern of a battery, the processor 120 may identify whether the processor 120 is in the wake-up state. When the processor 120 is in the wake-up state ("Yes"), the processor 120 may perform operation 1603. Otherwise ("No"), the processor 120 may perform operation 1605.

According to various embodiments, in operation 1603, the processor 120 may monitor a usage pattern of a battery in each designated period (e.g. every ten minutes) while the processor 120 is in the wake-up state ("Yes"). For example, the processor 120 may monitor a usage pattern of a battery in the each designated period while the processor 120 is in the wake-up state and the electronic device 101 operates using power provided from the battery. For example, the processor 120 may monitor the usage pattern of the battery by monitoring the remaining level of the battery or the discharge rate of the battery while the processor 120 is in the wake-up state and the electronic device 101 operates using power provided from the battery.

According to various embodiments, in operation 1605, the processor 120 may defer monitoring a usage pattern of a battery while the processor 120 is in a sleep state ("No"). For example, in order to monitor the usage pattern of the battery, the processor 120 may restrict switching the state of the processor 120 to a wake-up state and defer monitoring the usage pattern of the battery until the state of the processor 120 is switched to the wake-up state.

As described above, the electronic device 101 according to various embodiments may monitor the usage pattern of the battery while the processor 120 is in a wake-up state, and thus may prevent separate power from being consumed in switching the state of the processor 120 from the sleep state to the wake-up state.

Figure 17:
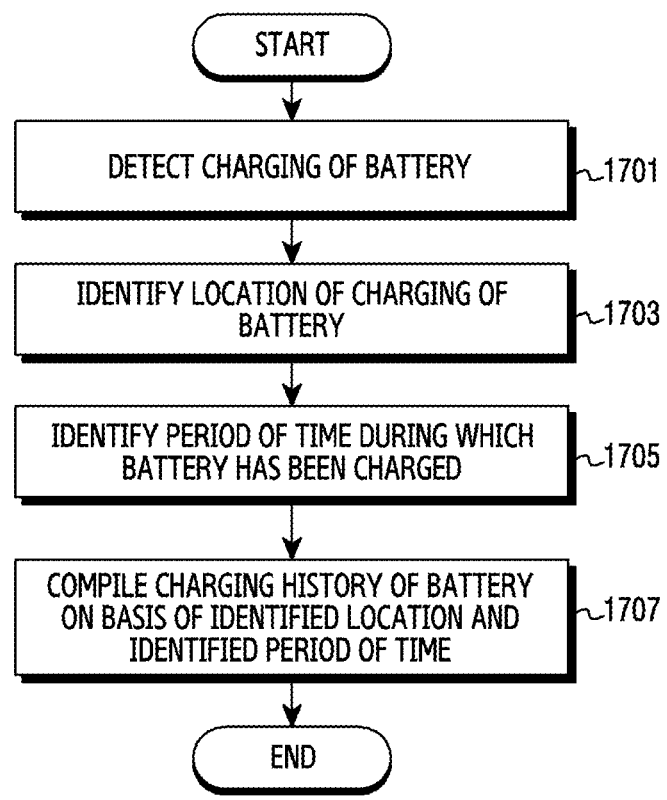
FIG. 17 is a flow diagram illustrating a method for compiling a charging history of a battery according to various embodiments.

FIG. 17 is a flow diagram illustrating a method for compiling a charging history of a battery according to various embodiments. This method may be performed by the electronic device 101 or the processor 120 of the electronic device 101 illustrated in FIG. 1.

The operations of FIG. 17 according to various embodiments will be described with reference to the elements of the electronic device 101 in FIG. 1.

Referring to FIG. 17, in accordance with various embodiments, in operation 1701, the processor 120 may detect charging of a battery. For example, the processor 120 may detect, using the power management module 188, that an external electronic device for providing power to the battery is electrically connected to the electronic device 101. For example, the processor 120 may detect, using the communication module 190, that an external electronic device for providing power to the battery is electrically connected to the electronic device 101. However, the description is not limited thereto.

According to various embodiments, in operation 1703, the processor 120 may identify a location of the charging of the battery. For example, in response to the detection of charging of the battery, the processor 120 may identify a location of the electronic device 101 by using the communication module 190, and may identify the identified location of the electronic device 101 as the location of the charging of the battery.

According to various embodiments, in operation 1705, in response to detecting a release of the charging of the battery, the processor 120 may identify a period of time during which the battery has been charged. For example, the processor 120 may detect charging of the battery in operation 1701 and may then monitor whether the charging of the battery is maintained. For example, the processor 120 may monitor, using the communication module 190 or the power management module 188, whether the charging of the battery is maintained. Based on monitoring that the charging of the battery is released, the processor 120 may identify the period of time during which the battery has been charged.

According to various embodiments, in operation 1707, the processor 120 may compile a charging history of the battery based on the identified location and the identified period of time. In various embodiments, the compiling may include refining or updating the charging history of the battery. In various embodiments, the compiling may include converting or summarizing the charging history of the battery so that the model can quickly search for the charging history of the battery. In various embodiments, the compiling may include converting or editing the charging history of the battery so that the model can easily access the charging history of the battery. However, the compiling is not limited thereto. For example, the processor 120 may compile a charging history of a battery in order to acquire, by using the model, more accurate information on a time at which the battery is estimated to be charged or on a location in which the battery is estimated to be charged.

Figure 18:
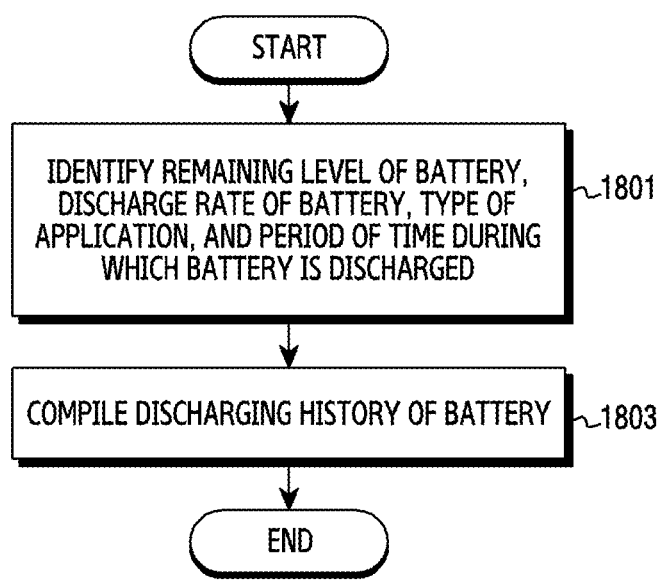
FIG. 18 is a flow diagram illustrating a method for compiling a charging history of a battery according to various embodiments.

FIG. 18 is a flow diagram illustrating a method for compiling a charging history of a battery according to various embodiments. This method may be performed by the electronic device 101 or the processor 120 of the electronic device 101 illustrated in FIG. 1.

The operations of FIG. 18 according to various embodiments will be described with reference to the elements of the electronic device 101 in FIG. 1.

Referring to FIG. 18, in accordance with various embodiments, in operation 1801, the processor 120 may identify, during discharging of a battery, at least one among the remaining level of the battery, the discharge rate of the battery, the type of application causing the battery to be discharged, and the period of time during which the battery is discharged. For example, the processor 120 may identify, while the electronic device 101 is operated by power provided from the battery, at least one among the remaining level of the battery, the discharge rate of the battery, the type of application causing the battery to be discharged, and the period of time during which the battery is discharged.

According to various embodiments, in operation 1803, the processor 120 may compile a discharging history of the battery based on the remaining level of the battery, the discharge rate of the battery, the type of application causing the battery to be discharged, and the period of time during which the battery is discharged. In various embodiments, the compiling may include refining or updating the discharging history of the battery. In various embodiments, the compiling may include converting or summarizing the discharging history of the battery so that the model can quickly search for the discharging history of the battery. In various embodiments, the compiling may include converting or editing the discharging history of the battery so that the model can easily access the discharging history of the battery. However, the compiling is not limited thereto. For example, the processor 120 may compile a discharging history of a battery in order to acquire, by using the model, a more accurate reference pattern to be used for a comparison with a usage pattern of the battery.

Figure 19:
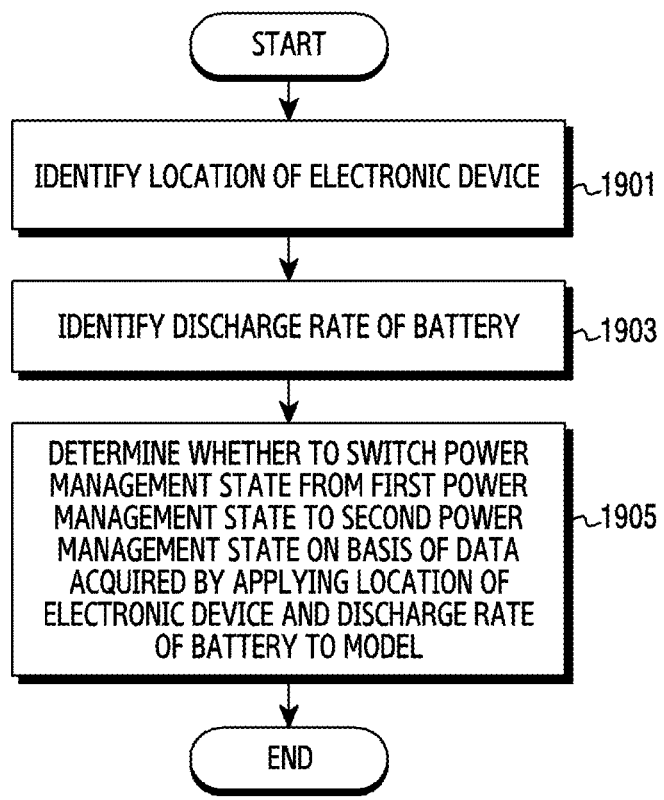
FIG. 19 is a flow diagram illustrating a method for providing an adaptive power management state according to various embodiments.

FIG. 19 is a flow diagram illustrating a method for providing an adaptive power management state according to various embodiments. This method may be performed by the electronic device 101 or the processor 120 of the electronic device 101 illustrated in FIG. 1.

The operations of FIG. 19 according to various embodiments will be described with reference to the elements of the electronic device 101 in FIG. 1.

Referring to FIG. 19, in accordance with various embodiment, in operation 1901, the processor 120 may identify a location of the electronic device 101 operating in a first power management state. For example, the processor 120 may identify the location of the electronic device 101 operating in the first power management state by using a location measurement circuitry (e.g. the communication module 190) of the electronic device 101.

According to various embodiments, in operation 1903, the processor 120 may identify a discharge rate of a rechargeable battery of the electronic device 101. For example, the processor 120 may identify the discharge rate of the battery based on a signal received from a power management circuit (e.g. the power management module 188 in FIG. 1) electrically connected to the battery. For example, the processor 120 may identify the discharge rate of the battery by measuring the remaining level of the battery through the power management circuit in each designated period.

According to various embodiments, in operation 1905, based on data acquired by applying the location of the electronic device 101 and the discharge rate of the battery to a model trained based on a discharging history of the battery and a charging history of the battery, the processor 120 may determine whether to switch the power management state of the electronic device 101 from the first power management state to a second power management state.

For example, the processor 120 may identify a discharge rate of the battery while it is identified, using the location measurement circuitry, that the electronic device 101 is within a first location, and may switch the first power management state to the second power management state based on data acquired by applying information on the discharge rate and information on the first location to the model. For example, the processor 120 may apply the discharge rate to the model to determine an estimated time point at which the remaining level of the battery reaches a reference battery level, and may switch the first power management state to the second power management state based on the estimated time point and the distance between the first location and a location in which the battery is estimated to be charged and which is acquired using the model. For example, the processor 120 may switch the first power management state to the second power management state based on the distance between the first location and the location in which the battery is estimated to be charged, a time of day at which the discharge rate has been identified, and a time of day at which the battery is estimated to be charged and which is acquired using the model.

In another example, the processor 120 may identify the discharge rate of the battery while it is identified, using the location measurement circuitry, that the electronic device 101 is within a second location different from the first location, and may maintain the first power management state based on another data acquired by applying information on the discharge rate and information on the second location to the model. For example, the processor 120 may determine the estimated time point by applying the discharge rate to the model, and may maintain the first power management state based on the estimated time point and the distance of the second location and the location. For example, the processor 120 may maintain the first power management state based on the distance between the second location and the location in which the battery is estimated to be charged, the time of day at which the discharge rate has been identified, and the time of day at which the battery is estimated to be charged and which is acquired using the model.

As described above, the electronic device 101 according to various embodiments may provide a power management service adaptable to a context by using the location of the electronic device 101, the present time, and the model.

An electronic device, a method, and computer readable medium adaptable to a context according to various embodiments may provide a user experience suitable for user preference based on adaptive power management.

Effects which can be acquired by the disclosure are not limited to the above described effects, and other effects that have not been mentioned may be clearly understood by those skilled in the art to which the disclosure belongs from the following description.

Methods according to embodiments described in the claims or specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured to be executed by one or more processors within the electronic device. The one or more programs may include instructions that cause the electronic device to perform the methods according to embodiments described in the claims and specification of the disclosure.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, the programs may be stored in a memory formed by a combination of some or all thereof. Further, a plurality of such memories may be included in the electronic device.

In addition, the programs may be stored in an attachable storage device which may access the electronic device through a communication network such as the Internet, Intranet, a local area network (LAN), a wide LAN (WLAN), or a storage area network (SAN) or through a communication network formed by a combination thereof. Such a storage device may access the electronic device performing the embodiments of the disclosure via an external port. Further, a separate storage device on the communication network may access the electronic device which performs the embodiments of the disclosure.

In the above-described detailed embodiments of the disclosure, a component included in the disclosure is expressed in a singular or plural form according to a presented detailed embodiment. However, the singular or plural form is selected for convenience of description suitable for the presented situation, and the disclosure is not limited to a single element or multiple elements thereof. Further, multiple elements expressed in the description may be configured into a single element, or a single element expressed in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
   a location measurement circuitry;
   a rechargeable battery;
   a memory configured to store instructions; and
   at least one processor, wherein the at least one processor is configured to execute the instructions to:
   monitor a usage pattern of the battery while the electronic device operates in a first power management state, the first power management state comprising a state in which the at least one processor is driven based on a first maximum driving frequency;
   predict a reference pattern comprising a future charging pattern of the battery and a future discharging pattern of the battery based on the usage pattern of the battery, by using a model trained based on a discharging history of the battery and a charging history of the battery;
   compare the usage pattern of the battery with the reference pattern;
   in response to comparing, acquire, based on determining that the usage pattern of the battery is different from the reference pattern derived from the model trained on a discharging history of the battery and a charging history of the battery, information on a location in which the battery is estimated to be charged and information on a time at which the battery is estimated to be charged using the model; and
   switch, at least partially based on the information on the location and the information on the time, the first power management state to a second power management state, the second power management state comprising a state in which the at least one processor is driven based on a second maximum driving frequency lower than the first maximum driving frequency.

2. The electronic device of claim 1, wherein the at least one processor is further configured to execute the instructions to:
acquire information on a location of the electronic device by using the location measurement circuitry;
compare the information on the location of the electronic device with the information, acquired from the model, on the location in which the battery is estimated to be charged;
compare a present time with the time at which the battery is estimated be charged; and
switch, based on results of the comparisons, the first power management state to the second power management state.

3. The electronic device of claim 2, wherein the location measurement circuitry comprises at least one of a global positioning system (GPS) or at least one communication circuit.

4. The electronic device of claim 1, wherein:
the first power management state further comprises a state in which the memory is driven based on a third maximum driving frequency; and
the second power management state further comprises a state in which the memory is driven based on a fourth maximum driving frequency, the fourth maximum driving frequency lower than the third maximum driving frequency.

5. The electronic device of claim 1, further comprising a display, wherein:
the first power management state further comprises a state in which a screen is displayed on the display at first brightness; and
the second power management state further comprises a state in which a screen is displayed on the display at second brightness, the second brightness lower than the first brightness.

6. The electronic device of claim 1, further comprising a display, wherein:
the first power management state further comprises a state in which a screen is, based on a first frame rate, displayed on the display; and
the second power management state further comprises a state in which a screen is displayed on the display based on a second frame rate, the second frame rate lower than the first frame rate.

7. The electronic device of claim 1, further comprising a display, wherein:
the first power management state further comprises a state in which a screen is displayed on the display at a first resolution; and
the second power management state further comprises a state in which a screen is displayed on the display at a second resolution, the second resolution lower than the first resolution.

8. The electronic device of claim 1, further comprising a display, wherein:
the at least one processor is further configured to execute the instructions to display on the display a user interface, the user interface comprising an object for selecting whether to enable an adaptive power management state in which one among multiple power management states comprising the first power management state and the second power management state is adaptively selected using the model;
the object is provided in a non-executable state while reliability of result data derived from the model is lower than reference reliability; and
the object is provided in an executable state while the reliability of the result data derived from the model is equal to or higher than the reference reliability.

9. The electronic device of claim 8, wherein the object provided in the executable state comprises:
a first state indicating that the adaptive power management state is enabled; and
a second state indicating that the adaptive power management state is disabled.

10. The electronic device of claim 9, wherein:
the user interface further comprises a list, the list comprising multiple objects for indicating the multiple power management states, respectively; and
the at least one processor is further configured to execute the instructions to:
enable the adaptive power management state based on identifying that the object is in the first state,
while the adaptive power management state is enabled:
monitor the usage pattern of the battery while the electronic device operates in the first power management state,
acquire, based on determining that the usage pattern of the battery is different from the reference pattern, the information on the location in which the battery is estimated to be charged and the information on the time at which the battery is estimated to be charged using the model, and
switch, at least partially based on the information on the location and the information on the time, the first power management state to the second power management state in which the at least one processor is driven based on the second maximum driving frequency, the second maximum driving frequency lower than the first maximum driving frequency.

11. The electronic device of claim 10, wherein the at least one processor is further configured to execute the instructions to:
indicate in the list that, when the electronic device is in the first power management state while the adaptive power management state is enabled, the first power management state is selected from among the multiple power management states; and
indicate in the list that, when the electronic device is in the second power management state while the adaptive power management state is enabled, the second power management state is selected from among the multiple power management states.

12. The electronic device of claim 1, wherein the model is a model configured to provide a result having reliability equal to or higher than reference reliability to input target data.

13. The electronic device of claim 1, wherein the model is configured to predict the future charging pattern of the battery and the future discharging pattern of the battery based on past battery operating heuristics, the heuristics comprising the discharging history of the battery and the charging history of the battery.

14. The electronic device of claim 1, wherein the at least one processor is further configured to execute the instructions to:

identify an estimated load level of the at least one processor by using the model;

determine whether the estimated load level is lower than a reference load level;

configure a maximum driving frequency of the at least one processor as a third driving frequency based on a determination that the estimated load level is lower than the reference load level; and configure the maximum driving frequency of the at least one processor as a fourth driving frequency higher than the third driving frequency based on a determination that the estimated load level is equal to or higher than the reference load level.

15. The electronic device of claim 1, wherein the at least one processor is further configured to execute the instructions to monitor the usage pattern of the battery in each designated period while the at least one processor is in a wake-up state.

16. The electronic device of claim 1, wherein:
the first power management state comprises a state in which a high-performance cluster among multiple clusters of the at least one processor is used; and
the second power management state comprises a state in which a use of the high-performance cluster among the multiple clusters is restricted.

17. The electronic device of claim 16, wherein the at least one processor is configured to execute the instructions to restrict a use of the high-performance cluster by migrating a task executed using the high-performance cluster to a power-saving cluster in response to the switch to the second power management state.

18. An electronic device comprising:
a location measurement circuitry;
a rechargeable battery;
a memory configured to store instructions; and
at least one processor, wherein the at least one processor is configured to execute the instructions to:
while it is identified using the location measurement circuitry that the electronic device operating in a first power management state is within a first location:
identify a discharge rate of the battery,
determine, by applying the discharge rate to a model, an estimated time point at which a remaining level of the battery reaches a reference battery level, and
switch the first power management state to a second power management state, based on data obtained by applying information on the discharge rate and information on the first location to a model, the model trained based on a discharging history of the battery and a charging history of the battery the estimated time point and a distance between the first location and a location that is acquired using the model and in which the battery is estimated to be charged, and
while it is identified using the location measurement circuitry that the electronic device operating in the first power management state is within a second location different from the first location:
identify the discharge rate of the battery,
determine the estimated time point by applying the discharge rate to the model, and
maintain the first power management state based on another data obtained by applying the information on the discharge rate and information on the second location to the model the estimated time point and a distance between the second location and the location.

19. The electronic device of claim 18, wherein the at least one processor is further configured to execute the instructions to:
switch the first power management state to the second power management state based on:
the distance between the first location and the location in which the battery is estimated to be charged,
a time of day at which the discharge rate has been identified, and
a time of day at which the battery is estimated to be charged, the time of day at which the battery is estimated to be charged acquired using the model; and
maintain the first power management state based on:
the distance between the second location and the location in which the battery is estimated to be charged,
the time of day at which the discharge rate has been identified, and
the time of day at which the battery is estimated to be charged, the time of day at which the battery is estimated to be charged acquired using the model.

* * * * *